United States Patent
Kuroki et al.

(10) Patent No.: US 12,181,436 B2
(45) Date of Patent: Dec. 31, 2024

(54) GAS SENSOR ELEMENT AND GAS SENSOR

(71) Applicant: DENSO CORPORATION, Kariya (JP)

(72) Inventors: Chika Kuroki, Kariya (JP); Satoshi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 769 days.

(21) Appl. No.: 17/356,968

(22) Filed: Jun. 24, 2021

(65) Prior Publication Data

US 2021/0318262 A1    Oct. 14, 2021

Related U.S. Application Data

(63) Continuation of application No. PCT/JP2019/043579, filed on Nov. 7, 2019.

(30) Foreign Application Priority Data

Dec. 28, 2018  (JP) ................... 2018-246366

(51) Int. Cl.
| | |
|---|---|
| *G01N 27/407* | (2006.01) |
| *G01N 27/406* | (2006.01) |
| *G01N 27/409* | (2006.01) |
| *G01N 27/41* | (2006.01) |

(52) U.S. Cl.
CPC ..... *G01N 27/4071* (2013.01); *G01N 27/4067* (2013.01); *G01N 27/4075* (2013.01); *G01N 27/409* (2013.01); *G01N 27/41* (2013.01)

(58) Field of Classification Search
CPC ........... G01N 27/4071; G01N 27/4075; G01N 27/409; G01N 27/41; G01N 27/406; G01N 27/4067; G01N 27/407; G01N 27/4072; G01N 27/4076
See application file for complete search history.

(56) References Cited

U.S. PATENT DOCUMENTS

| | | | |
|---|---|---|---|
| 2015/0293051 A1* | 10/2015 | Kajiyama | G01N 27/4075 204/424 |
| 2018/0059046 A1* | 3/2018 | Okamoto | G01N 27/4076 |
| 2018/0202965 A1* | 7/2018 | Nakatou | G01N 27/41 |

FOREIGN PATENT DOCUMENTS

JP       2017020838 A  *  1/2017  ......... G01N 27/4074

* cited by examiner

*Primary Examiner* — James Lin
*Assistant Examiner* — Vivian A Tran
(74) *Attorney, Agent, or Firm* — Nixon & Vanderhye P.C.

(57) ABSTRACT

A gas sensor element includes a solid electrolyte body, a measurement electrode film, and a measured-gas intake port. The measurement electrode film includes a noble metal region, a solid electrolyte region, and a mixed region in which a noble metal and a solid electrolyte are mixed together. The measurement electrode film has a structure in which a first average thickness of the mixed region within a first region is greater than a second average thickness of the mixed region within a second region that is closer to a center of the measurement electrode film than the first region in a direction along an intake direction of a measured gas is. The first region is a region from an electrode end on the measured-gas intake port side to ¼ of an overall length of the measurement electrode film in the direction along the intake direction of the measured gas.

14 Claims, 14 Drawing Sheets

CONVENTIONAL

STRUCTURE ACCORDING TO FOURTH EMBODIMENT

BSE IMAGE

NOBLE METAL REGION

MIXED REGION  313

AVERAGE THICKNESS $D_i$ OF MIXED REGION IN FIRST REGION [$\mu$m]

AVERAGE THICKNESS $D_3$ OF MIXED REGION IN MEASUREMENT ELECTRODE FILM [$\mu$m]

GAS SENSOR ELEMENT AND GAS SENSOR

CROSS-REFERENCE TO RELATED APPLICATIONS

The present application is a continuation application of International Application No. PCT/JP2019/043579, filed on Nov. 7, 2019, which claims priority to Japanese Patent Application No. 2018-246366, filed on Dec. 28, 2018. The contents of these applications are incorporated herein by reference in their entirety.

BACKGROUND

Technical Field

The present disclosure relates to a gas sensor element and a gas sensor.

Related Art

For example, a gas sensor that includes a gas sensor element is used in detection of an exhaust gas that is discharged from an internal combustion engine. The gas sensor element has a solid electrolyte body that has oxygen ion conductivity, a measurement electrode film that is provided on one surface of the solid electrolyte body, and a reference electrode film that is provided on another surface of the solid electrolyte body. The measurement electrode film contains noble metal particles, such as platinum (Pt), and solid electrolyte particles that have oxygen ion conductivity.

SUMMARY

One aspect of the present disclosure provides a gas sensor element that includes a solid electrolyte body, a measurement electrode film, and a measured-gas intake port. The measurement electrode film includes a noble metal region, a solid electrolyte region, and a mixed region in which a noble metal and a solid electrolyte are mixed together. The measurement electrode film has a structure in which a first average thickness of the mixed region present within a first region is greater than a second average thickness of the mixed region present within a second region that is closer to a center of the measurement electrode film than the first region in a direction along an intake direction of a measured gas is. The first region is a region from an electrode end on the measured-gas intake port side to ¼ of an overall length of the measurement electrode film in the direction along the intake direction of the measured gas.

DESCRIPTION OF THE EMBODIMENTS

Figure 1:
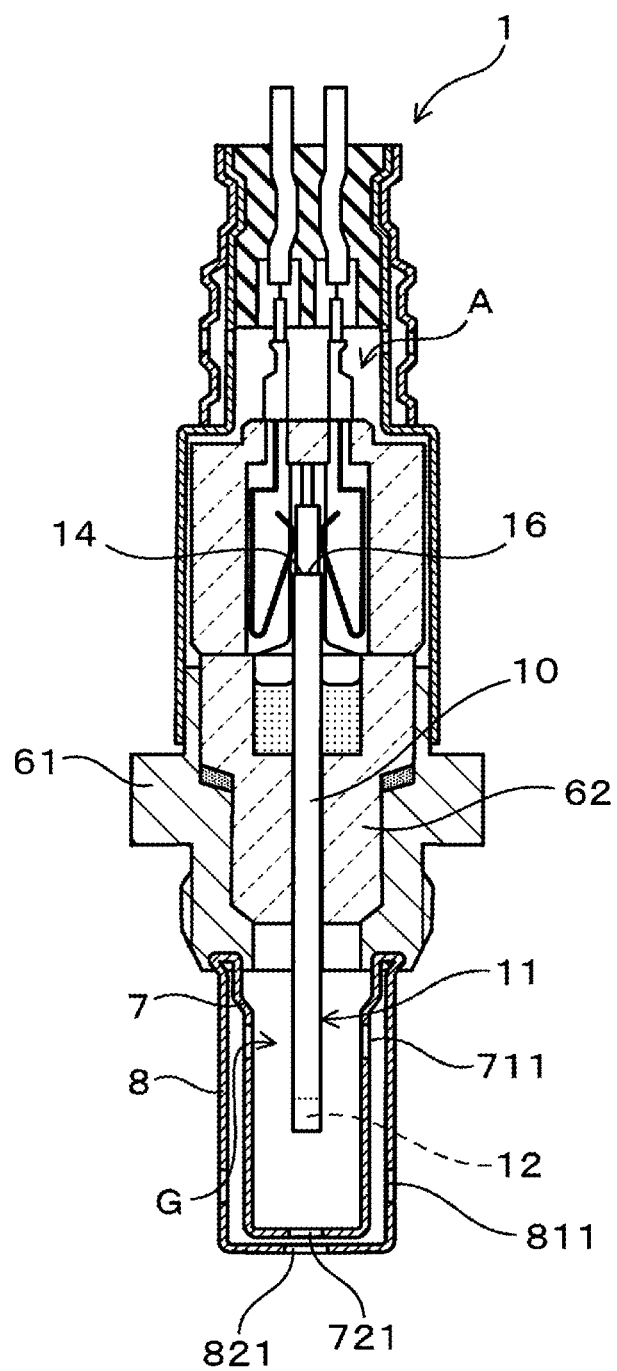
FIG. 1 is a cross-sectional view of a gas sensor according to a first embodiment.

In JP-A-2014-122878, a gas sensor electrode that has a noble metal, a solid electrolyte, and a mixed region in which the noble metal and the solid electrolyte are mutually incorporated is disclosed. The mixed region is formed in the electrode. Thus, a three-phase interface between a noble metal region, a solid electrolyte region, and a gas-phase region of a measured gas increases. Therefore, activity of the electrode increases. Consequently, electrode interface resistance decreases, and variations in sensor output can be suppressed.

While the mixed region of the measurement electrode film leads to increase in the three-phase interface, the mixed region also leads to increase in capacitance. The increase in capacitance may be a factor in decrease in responsiveness to changes in the measured gas, such as responsiveness to switching of an air-fuel ratio of the exhaust gas. Therefore, there is room for further improvement in the responsiveness of the gas sensor.

It is thus desired to provide a gas sensor element and a gas sensor that have a short electrode activation time and excellent responsiveness.

A first exemplary embodiment of the present disclosure provides a gas sensor element that includes: a solid electrolyte body; a measurement electrode film that is formed on a main surface of the solid electrolyte body and exposed to a measured gas; and a measured-gas intake port into which the measured gas is introduced. In the gas sensor element, the measurement electrode film has a noble metal region that includes a noble metal, a solid electrolyte region that includes a solid electrolyte, and a mixed region in which the noble metal and the solid electrolyte are mixed together.

The measurement electrode film has a structure in which a first average thickness of the mixed region that is present within a first region from an electrode end on the measured-gas intake port side to ¼ of an overall length of the measurement electrode film in a direction along an intake direction of the measured gas is greater than a second average thickness of the mixed area that is present within a second region that is closer to a center of the measurement electrode film than the first region in the direction along the intake direction is.

A second exemplary embodiment of the present disclosure provides a gas sensor that includes the above-described gas sensor element.

The measurement electrode film in the above-described gas sensor element has the mixed region in which the noble metal and the solid electrolyte are mixed together. The mixed region increases an amount of a three-phase interface that serves as a reaction section of the noble metal, the solid electrolyte, and the measured gas. As a result, the electrode activation time of the measured gas is shortened, and the gas sensor element can detect the measured gas at an early stage.

In addition, the measurement electrode film has a distribution in the thickness of the mixed area. The first average thickness of the mixed region that is present within the first region that is positioned on the measured-gas intake port is greater than the second average thickness of the mixed region that is present within the second region that is closer to the center of the first region. That is, in a measurement electrode, a distribution is formed in the amount of three-phase interface. The amount of three-phase interface on the measured-gas intake port side is large. Because the measured gas is introduced into the gas sensor element from the measured-gas intake port, the measured gas passes over the measurement electrode film along the intake direction.

At this time, in the gas sensor element configured as described above, electrode reaction sufficiently progresses on the electrode end on the measured-gas intake port side in which the thickness of the mixed region is large. The measured gas in which oxygen is consumed by the electrode reaction passes in the direction along the intake direction from the electrode end. Consequently, electrode activity is kept sufficiently high even when the structure is provided.

Furthermore, the structure can reduce the thickness of the mixed region in the region closer to the center than the first region is. Therefore, capacitance of the overall measurement electrode film can be reduced while the electrode activity is kept high. Consequently, charging/discharging becomes faster, and responsiveness to changes in the measured gas can be prevented from decreasing.

In this manner, the above-described gas sensor element has the structure in the thickness of the mixed region between the first region and the region closer to the center than the first region is. As a result, a mixed region amount in the overall measurement electrode film can be suppressed while the mixed region amount that is required for electrode activity is maintained, and reduction in capacitance is achieved. Consequently, responsiveness of the gas sensor element and the gas sensor that includes the gas sensor element can be improved, while the electrode activation time thereof is shortened.

As described above, according to the above-described exemplary embodiments, a gas sensor element and a gas sensor that provides both high electrode activity and excellent responsiveness can be provided.

First Embodiment

A gas sensor element and a gas sensor according to a first embodiment will be described with reference to FIGS. 1 to 11. As shown in examples in FIGS. 2 to 4, a gas sensor element 10 has at least a solid electrolyte body 20, a measurement electrode film 31, and a measured-gas intake port 15.

The measurement electrode film 31 is formed on a surface of the solid electrolyte body 20. The measured-gas intake port 15 is an entrance for a measured gas G into the gas sensor element 10. The measured gas G is introduced into the gas sensor element 10 from the measured-gas intake port 15. According to the present embodiment, the measured-gas intake port 15 is formed on a tip end 13 in a longitudinal direction X of the gas sensor element 10. The tip end 13 is an end portion of the gas sensor element on a side that is exposed to the measured gas G An end portion of the gas sensor element on a side opposite to the tip end 13 is a base end 14. As shown in the examples in FIGS. 2 and 3, the gas sensor element 10 can further include a reference electrode film 32, a heater 5, and the like. In addition, a gas sensor 1 includes the gas sensor element 10. Details will be described below.

As shown in FIGS. 1 to 4, the gas sensor 1 according to the present embodiment is an exhaust system sensor that, with an exhaust gas that is discharged from an internal combustion engine as the measured gas G and atmospheric air as a reference gas A, measures an oxygen concentration, a specific gas component concentration, or the like in the measured gas G The gas sensor 1 and the gas sensor element 10 have an elongated shape that is elongated in the longitudinal direction X.

Specifically, the gas sensor 1 according to the present embodiment is an A/F (air-fuel ratio) sensor that is arranged in an exhaust pipe of an engine that serves as the internal combustion engine, and with the exhaust gas that passes through the exhaust pipe as the measured gas G and the atmospheric air as the reference gas A, determines the oxygen concentration in the measured gas G and determines the A/F in the engine based on the oxygen concentration. More specifically, the gas sensor 1 can serve as an A/F sensor that quantitatively determines the air-fuel ratio of the engine using a limiting current characteristic that is based on diffusion control of the measured gas G The gas sensor 1 can also be a concentration-cell type that detects whether the air-fuel ratio that is a mixture ratio of fuel and air in the engine is in a rich state that has excess fuel or a lean state that has excessive air in relation to a theoretical air-fuel ratio.

The gas sensor 1 can be configured as the gas sensor 1 other than the A/F sensor. That is, as long as the gas sensor 1 includes the gas sensor element 10 to which a configuration in which the measurement electrode film 31 has a mixed region 313 and a relationship $D_1>D_2$, described above, is satisfied is applicable, the gas sensor 1 can be applied to gas sensors such as the A/F sensor, an oxygen sensor, an $NO_X$ sensor, and the like.

The gas sensor 1 according to the present embodiment includes the gas sensor element 10, an insulator 62, a housing 61, an inner cover 7, and a outer cover 8. The insulator 62 holds the gas sensor element. The housing 61 holds the insulator 62. The inner cover 7 and the outer cover 8 are held by the housing.

The gas sensor element 10 has a protruding portion 11 that protrudes from the insulator 62. The inner cover 7 and the outer cover 8 cover the protruding portion 11 of the gas sensor element 10. A gas measuring portion 12 that is exposed to the measured gas G and measures the oxygen concentration in the measured gas G is provided in the protruding portion 11.

Inner passage holes 711 and 721 through which the measured gas G passes are formed in the inner cover 7. Outer passage holes 811 and 821 through which the measured gas G passes are formed in the outer cover 8. Here, instead of a double-layer protective cover that is the inner cover 7 and the outer cover 8 being used, a single-layer protective cover can be used. In addition, arrangement of the inner passage holes 711 and 721 and the outer passage holes 811 and 821 is not particularly limited.

Figure 2:
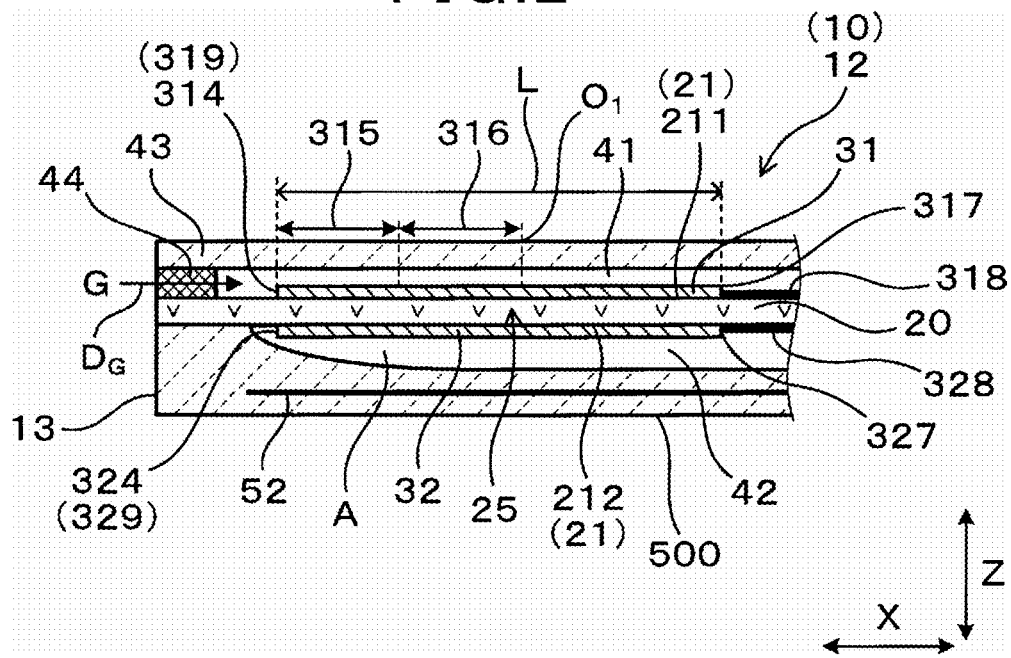
FIG. 2 is a cross-sectional view in a longitudinal direction of a gas sensor element according to the first embodiment.
Figure 3:
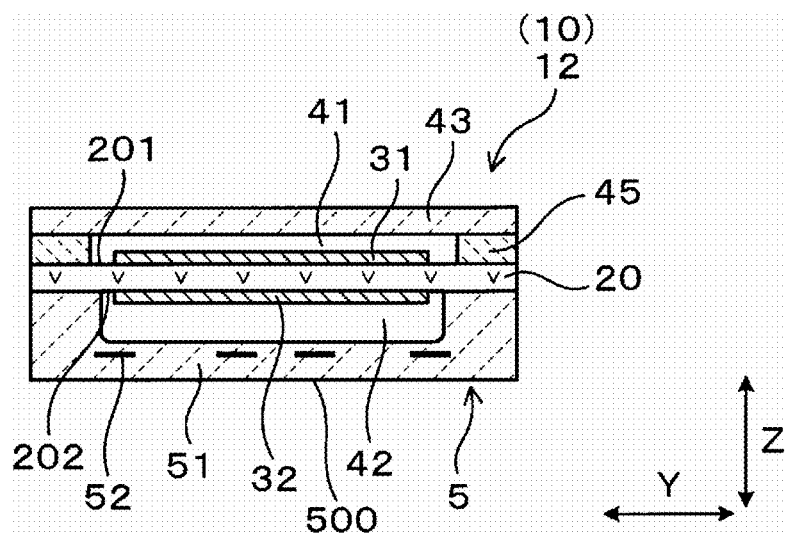
FIG. 3 is a cross-sectional view in a transverse direction of the gas sensor element according to the first embodiment.
Figure 4:
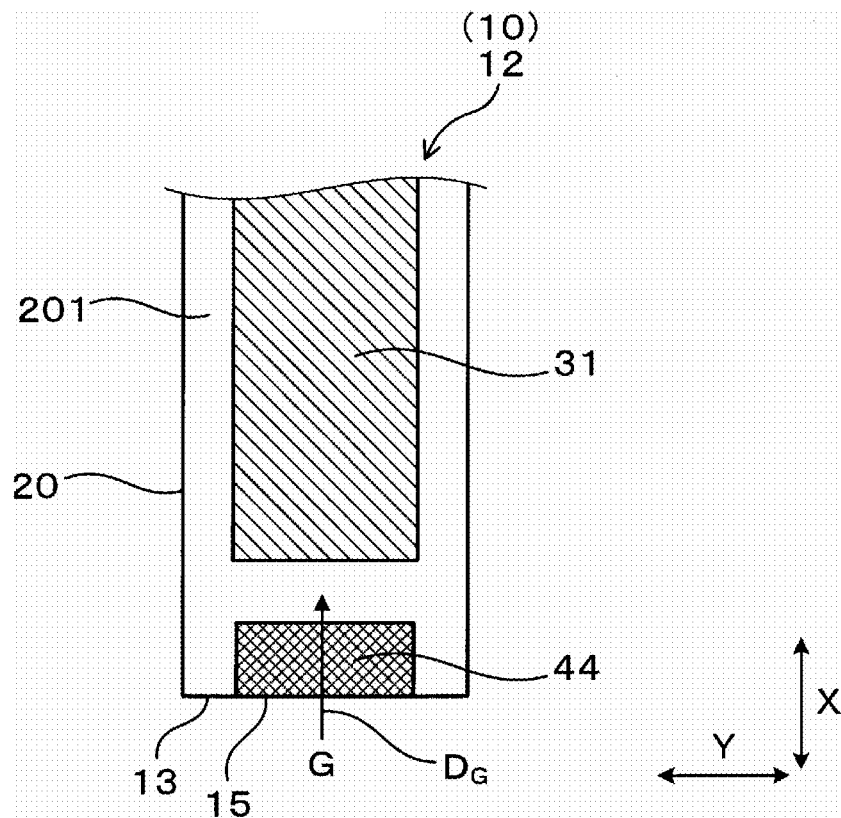
FIG. 4 is a plan view of a measurement electrode film formation surface of a solid electrolyte body in the gas sensor element according to the first embodiment.

As shown in FIGS. 2 and 3, the gas measuring portion 12 has the measured-gas intake port 15, the measurement electrode film 31, the reference electrode film 32, and a portion of the solid electrolyte body 20 that is sandwiched between the electrode films. The measurement electrode film 31 is exposed to the measured gas G and the reference electrode film 32 is exposed to the reference gas A. The heater 5 for heating and activating the solid electrolyte body 20, the measurement electrode film 31, and the reference electrode film 32 is laminated on the solid electrolyte body 20 in the gas sensor element 10.

Shapes of the gas sensor element 10 and the solid electrolyte body 20 can be shapes that enable a configuration in which the measured gas G passes over the measurement electrode film 31 along an intake direction $D_G$ inside the gas sensor element 10. As shown in the examples in FIGS. 2 to 4, for example, the shape of the gas sensor element is a plate shape that has the longitudinal direction X. The plate-shaped gas sensor element 10 has the longitudinal direction X, a transverse direction Y, and a thickness direction Z. Among the longitudinal direction X, the transverse direction Y, and the thickness direction Z, one direction is orthogonal to the other two directions.

The solid electrolyte body 20 is made of a solid electrolyte such as stabilized zirconia or partially stabilized zirconia that contains a rare earth metal element or an alkaline earth metal element. According to the present embodiment, the solid electrolyte body 20 is specifically made of yttria partially stabilized zirconia.

The plate-shaped solid electrolyte body 20 has two main surfaces 21. A measured gas space 41 into which the measured gas G is introduced is formed on a first main surface 211. A reference gas space 42 into which the reference gas A is introduced is formed on a second main surface 212. That is, the first main surface 211 faces the measured gas space 41 and the second main surface 212 faces the reference gas space 42. The first main surface 211 and the second main surface 212 are surfaces of the solid electrolyte body 20 that are on sides opposite each other.

The measurement electrode film 31 is arranged in the measured gas space 41. The measured gas space 41 is formed such as to be surrounded by the solid electrolyte body 20, an insulating body 43, and the diffusion resistance layer 44. The diffusion resistance layer 44 enables the measured gas G to pass at a predetermined diffusion speed. According to the present embodiment, the diffusion resistance layer 44 is provided on the tip end 13 in the longitudinal direction X of the gas sensor element 10 that is the measured-gas intake port 15.

As shown in the example in FIG. 2, the measurement electrode film 31 has a first electrode end 319 and a second electrode end 317 on both ends of the gas sensor element 10 in the longitudinal direction X. The first electrode end 319 is an electrode end on the tip end 13 side and the second electrode end 317 is the electrode end on the base end side. According to the present embodiment, the measured-gas intake port 15 is formed on the tip end 13 of the gas sensor element 10. Therefore, the first electrode end 319 of the measurement electrode film is an electrode end 314 on the measured-gas intake port 15 side. The second electrode end 317 is an electrode end on a side opposite to the measured-gas intake port 15 side. An electrode lead 318 is connected to the second electrode end 317.

As shown in examples in FIGS. 6 to 8, 11A, and 11B, the measurement electrode film 31 has a noble metal region 311, a solid electrolyte region 312, and the mixed region 313. The noble metal region 311 includes a noble metal. The noble metal is Pt, Pd, Rh, Au, Ag, Ir, or the like. From a perspective of having excellent durability in a high-temperature, corrosive environment, the noble metal is preferably Pt. For example, the solid electrolyte region 312 includes a solid electrolyte that is similar to the solid electrolyte body 20. The mixed region 313 is a region in which the noble metal and the solid electrolyte are mixed together.

Specifically, the mixed region 313 is a region in which the noble metal and the solid electrolyte are in a mutually, three-dimensionally incorporated state on a nano level. The noble metal region 311, the solid electrolyte region 312, and the mixed region 313 can be differentiated by image analysis using a scanning electron microscope (SEM). Although details will be described in an experiment example, in an SEM image in FIG. 11 by (a), a white to light gray area is the noble metal region, a dark gray area is the solid electrolyte region, and an area surrounded by a dotted line is the mixed region. Here, black portions are air holes.

As shown in the examples in FIGS. 2 to 8, the measurement electrode film 31 has a distribution structure in a thickness of the mixed region 313. Specifically, the measurement electrode film 31 has a distribution structure in which a first average thickness $D_1$ of the mixed region 313 that is present within a first region 315 is greater than a second average thickness $D_2$ of the mixed region 313 that is present within a second region that is closer to a center $O_1$ than the first region 315 in a direction along the intake direction $D_G$ is. The distribution structure is defined by a relationship $D_1 > D_2$. This relationship will be described below.

FIG. 2 is a cross-sectional view on a plane along both the longitudinal direction X and the thickness direction Z of the gas sensor element, and is also a cross-sectional view on a plane along a lamination direction (that is, the thickness direction Z) of the gas sensor element and the intake direction $D_G$.

As shown in the example in FIG. 2, the measurement electrode film 31 has the first region 315 and a second region 316. The first region 315 is a region from the electrode end 314 on the measured-gas intake port 15 side of the measurement electrode film 31 to ¼ of an overall length L of the measurement electrode film 31 in the direction along the intake direction $D_G$ of the measured gas G The second region 316 is a region from a position at ¼ of the overall length L of the measurement electrode film 31 to the center $O_1$ of the overall length L of the measurement electrode film 31 in the direction along the intake direction $D_G$ of the measured gas G Here, the center $O_1$ of the overall length L of the measurement electrode film 31 is a position at ½ of the overall length L of the measurement electrode film 31.

The overall length L of the measurement electrode film 31 is a length of the measurement electrode film 31 in the direction along the intake direction $D_G$. The overall length L of the measurement electrode film 31 does not include a length of the electrode lead 318. When the measured-gas intake port 15 is formed on the tip end 13 in the longitudinal direction X of the gas sensor element 10 as according to the present embodiment, the overall length L of the measurement electrode film 31 is the length of the measurement electrode film 31 in the longitudinal direction X of the gas sensor element 10.

The intake direction $D_G$ is a direction in which the measured gas G is taken into the gas sensor element 10 and is a direction along a formation surface of the measurement electrode film 31. When the measured-gas intake port 15 is formed on the tip end 13 in the longitudinal direction X of the gas sensor element 10 as according to the present embodiment, the intake direction $D_G$ is the direction along the longitudinal direction X. The "direction along . . . direction" is synonymous with a "direction parallel to . . . direction."

The distribution structure of the mixed region 313 is defined by a first average thickness $D_1$ of the mixed region 313 in the first region 315 being greater than a second average thickness $D_2$ of the mixed region 313 in the second region 316. That is, a relationship $D_1 > D_2$ is established. As shown in the example in FIG. 7, it is thought that the first average thickness $D_1$ is large because, in the first region 315, a thickness $D_{11}$ of the mixed region 313 is large and there are many formation locations of the mixed region 313.

Figure 8:
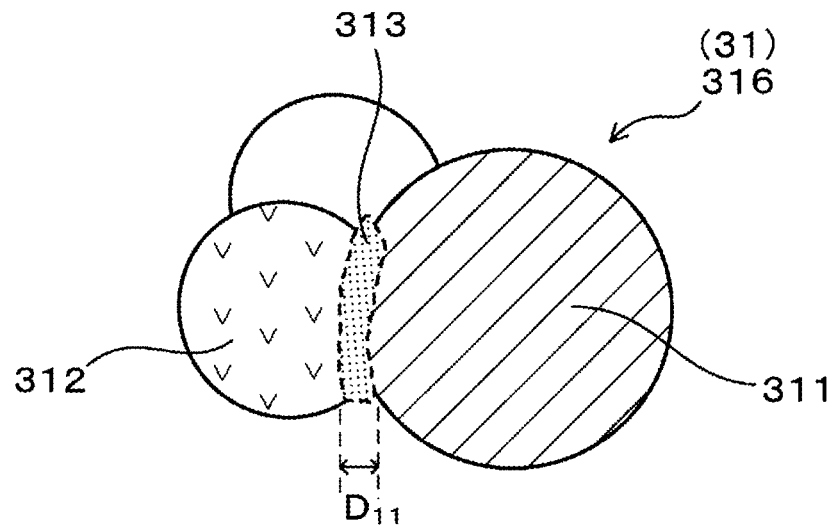
FIG. 8 is an explanatory diagram schematically showing the thickness of the mixed region in a second region according to the first embodiment.

As shown in the example in FIG. 8, it is thought that the second average thickness $D_2$ is small because, in the second region 316, the thickness $D_{11}$ of the mixed region 313 is small and there are few formation locations of the mixed region 313. The average thickness of the mixed region 313 has a correlation with an amount of mixed region 313. It is thought that content of the mixed region 313 increases as the average thickness of the mixed region 313 increases. A measurement method for the average thickness of the mixed region 313 will be described in the experiment example. From a perspective of improving both activation time and responsiveness at higher levels, $D_1 - D_2$ is preferably equal to or greater than 0.01 μm and more preferably equal to or greater than 0.02 μm.

In the measurement electrode film 31, the first average thickness $D_1$ of the mixed region 313 and a third average thickness $D_3$ of the mixed region 313 that is present within the measurement electrode film 31 preferably satisfy a relationship $D_1 > D_3$. From the perspective of improving both activation time and responsiveness at higher levels, $D_1 - D_3$ is preferably equal to or greater than 0.01 μm and more preferably equal to or greater than 0.02 μm.

Figure 6:
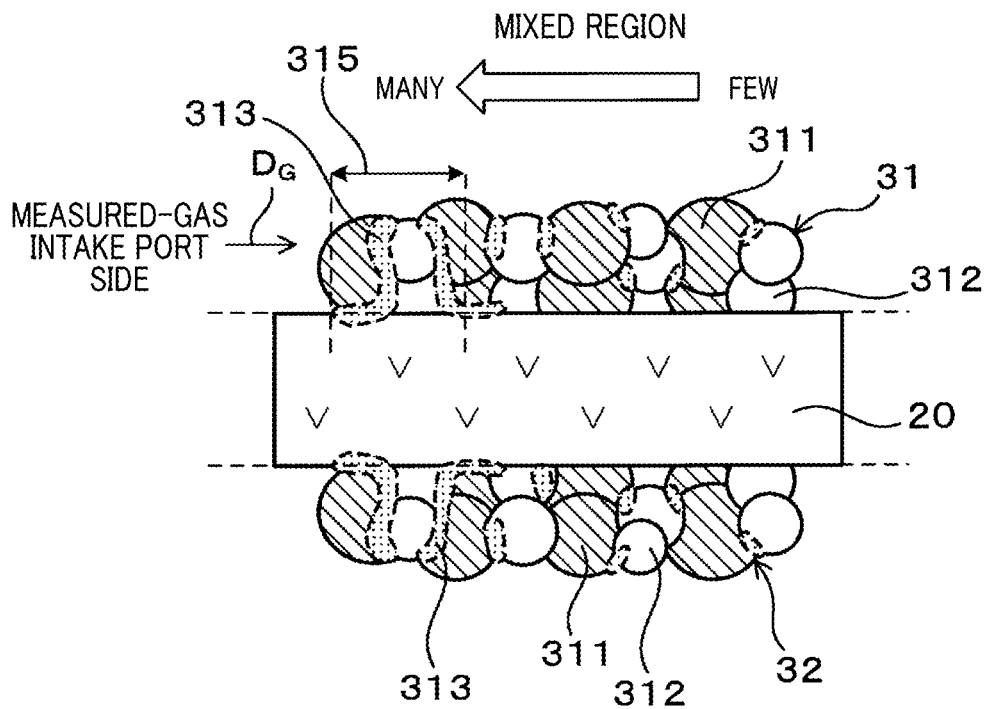
FIG. 6 is an explanatory diagram schematically showing a distribution structure of a mixed region in the measurement electrode film according to the first embodiment.
Figure 7:
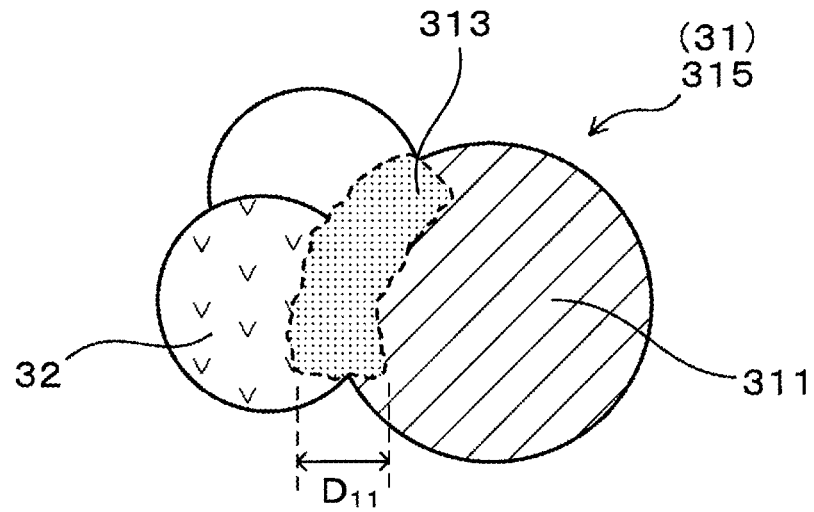
FIG. 7 is an explanatory diagram schematically showing a thickness of the mixed region in a first region according to the first embodiment.

As a mode in which the relationship $D_1 > D_2$ is satisfied and a mode in which the relationship $D_1 > D_3$ is satisfied, a distribution structure in which the thickness of the mixed region 313 decreases from the measured-gas intake port 15 side towards the center $O_1$ in the direction along the intake direction $D_G$ is given as an example in FIG. 6. However, the distribution structure is not limited to this structure. As long as the structure satisfies at least the relationship $D_1 > D_2$, the structure corresponds to the distribution structure.

From a perspective of shortening the electrode activation time and from a perspective of decreasing variations in the electrode activation time, the first average thickness $D_1$ of the mixed region 313 in the first region 315 is preferably equal to or greater than 0.1 μm, and more preferably equal to or greater than 0.17 μm. Meanwhile, when the thickness of the mixed region 313 is too large, strength of the measurement electrode film 31 may decrease due to progression of reduction of the solid electrolyte. From a perspective of sufficiently maintaining the strength of the measurement electrode film, the first average thickness $D_1$ is preferably equal to or less than 0.3 μm.

From a perspective of increasing responsiveness of the gas sensor 1, the third average thickness $D_3$ is preferably equal to or less than 0.08 μm, and more preferably equal to or less than 0.03 μm. From a perspective of suppressing occurrence of variations in the thickness of the mixed region 313 and suppressing occurrence of variations in the responsiveness of the gas sensor 1, the third average thickness $D_3$ is preferably equal to or greater than 0.01 μm.

As shown in the example in FIG. 2, the reference electrode film 32 has a first electrode end 329 and a second electrode end 327 on both ends in the longitudinal direction X of the gas sensor element 10. The first electrode end 329 is an electrode end on the tip end 13 side and the second electrode end 327 is an electrode end on the base end side. According to the present embodiment, the measured-gas intake port 15 is formed on the tip end 13 of the gas sensor element 10. Therefore, the first electrode end 319 of the reference electrode film 32 is an electrode end 324 on the measured-gas intake port 15 side. The second electrode end 327 is an electrode end on the side opposite to the measured-gas intake port 15 side. The second electrode end 327 is connected to an electrode lead 328.

The reference electrode film 32 is arranged in the reference gas space 42. The heater 5 is laminated on the second main surface 212 side of the solid electrolyte body 20. The heater 5 includes a heat generating body 52 that generates heat by energization, and a ceramic substrate 51 in which the heat generating body 52 is embedded. The reference gas space 42 is formed such as to be surrounded by the solid electrolyte body 20 and the ceramic substrate 51. The reference gas A is taken into the reference gas space 42 from a reference-gas intake port 16.

For example, the reference-gas intake port 16 is provided on the base end 14 in the longitudinal direction X of the gas sensor element 10. The reference-gas intake port 16 is formed in a position on the side opposite to the measured-gas intake port 15 in the longitudinal direction X of the gas sensor element 10.

In manufacturing the gas sensor element 10, a solid electrolyte sheet is formed by a paste of an electrode material that composes the electrode films 31 and 32 and the electrode leads 318 and 328 being applied to a ceramic sheet of a solid electrolyte. In addition, a laminated body is formed by sheets for forming the insulating body 43, the diffusion resistance layer 44, an insulating body 45 that serves as a spacer, and the heater 5, and the solid electrolyte sheet being laminated.

In a state in which pressure is applied in a lamination direction of the laminated body, the laminated body is fired. The lamination direction is a direction along the thickness direction Z of the gas sensor element. A groove is formed in advance in a heater substrate before firing by a circular disk-shaped cutting blade. Thus, the reference gas space is formed in the laminated body. The gas sensor element 10 can be obtained by firing.

The mixed region 313 is formed due to energization between the measurement electrode film 31 and the reference electrode film 32, and due to energization to the heater 5 of the gas sensor element 10. At this time, a positional relationship between the measurement electrode film 31 and the reference electrode film 32, and a heat generation distribution of the heater 5 are adjusted. Thus, the above-described distribution structure can be formed in the thickness of the mixed region 313. Details will be described according to a third embodiment and a fourth embodiment.

A reason for which the electrode activation time of the gas sensor element 10 is shortened and the responsiveness is improved when the reference electrode film 31 has the distribution structure of the mixed region 313 will be described. The electrode activation time is significantly dependent on active reaction sites of the measurement electrode film 31. The active reaction sites refer to an amount of three-phase interface between the noble metal, the solid electrolyte, and gas. As a method for increasing the active reaction sites, for example, a method in which the mixed region 313 is formed by an energization process is known. However, because capacitance of the electrode film is dependent on a capacitor capacitance of an interface between the noble metal and the solid electrolyte, the capacitance also increases with the amount of mixed region 313.

Figure 5:
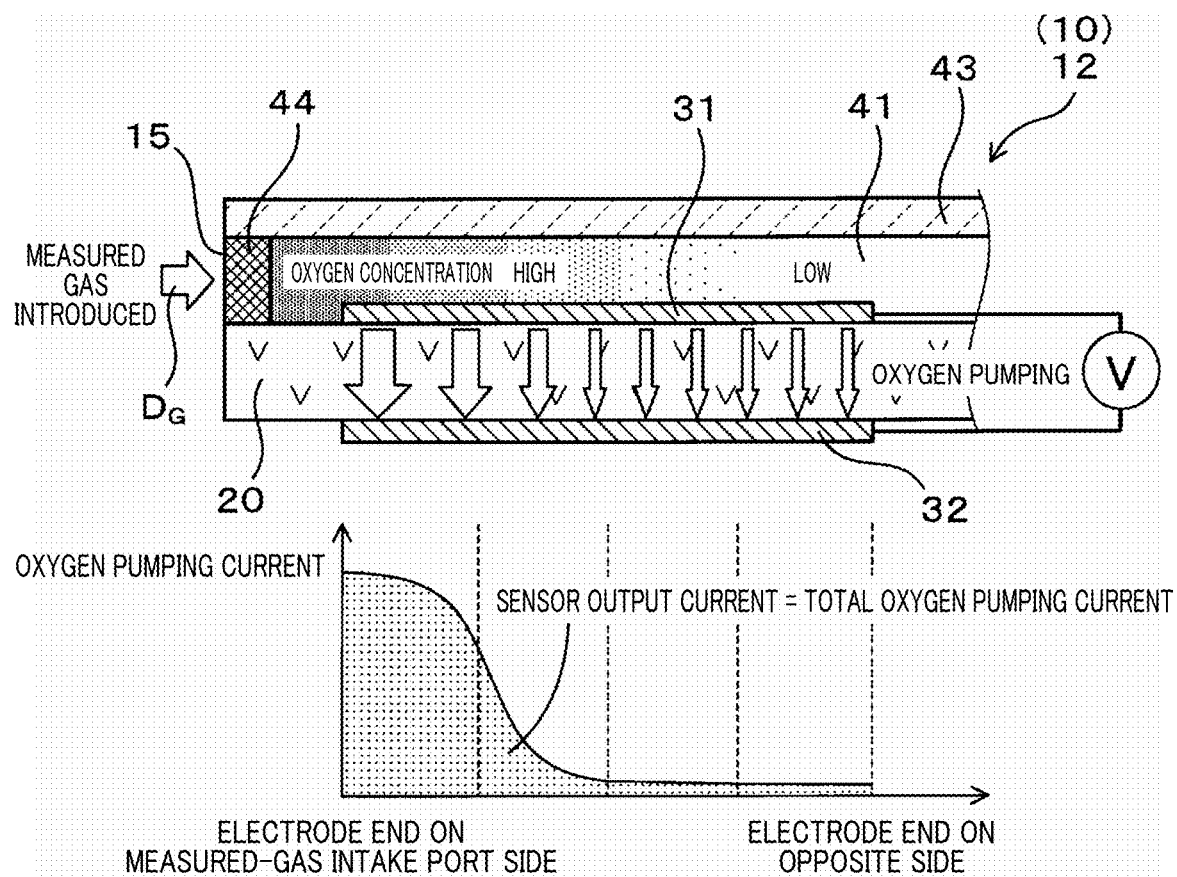
FIG. 5 is an explanatory diagram of a mechanism by which an effective electrode area is present in a measurement electrode film according to the first embodiment.

As shown in FIG. 5, the measured gas G that is introduced from the measured-gas intake port 15 is spread in the intake direction $D_G$. Taking into consideration a reaction mechanism on the measurement electrode film 31, an oxygen pumping reaction is started from near the measured-gas intake port 15. Thus, an oxygen concentration distribution is formed on the measurement electrode film 31 due to oxygen gas diffusion and oxygen pumping. As a result, an oxygen processing amount by pumping decreases farther away from the measured-gas intake port 15 along the intake direction $D_G$.

That is, in the measurement electrode film 31, an effective electrode area is present as electrode activity. A region of the effective electrode area is a region from the electrode end 314 on the measured-gas intake port 15 side to ¼ of the overall length L of the measurement electrode film 31 in the direction along the intake direction $D_G$. That is, the region in which the effective electrode area is present is the first region 315. Here, in FIG. 5, the oxygen concentration distribution on the measurement electrode film 31 within the measured gas space 41 is expressed by shading by dot hatching. The oxygen processing amount by pumping is expressed by a thickness of an arrow in a downward direction on a paper surface.

The measurement electrode film 31 according to the present embodiment has the distribution structure in the thickness of the mixed region as described above. That is, the thickness of the mixed region 313 in the first region 315 that is required for electrode activity is larger than that in the surrounding area. In this manner, while the amount of mixed region 313 that is required for activity is maintained by a given distribution in the mixed region 313, the amount of mixed region 313 in the overall measurement electrode film 31 can be suppressed. Thus, the capacitance can be reduced. Consequently, the electrode activation time of the gas sensor is shortened and the responsiveness is improved. This can be considered to be caused by a following reason.

Figure 9:
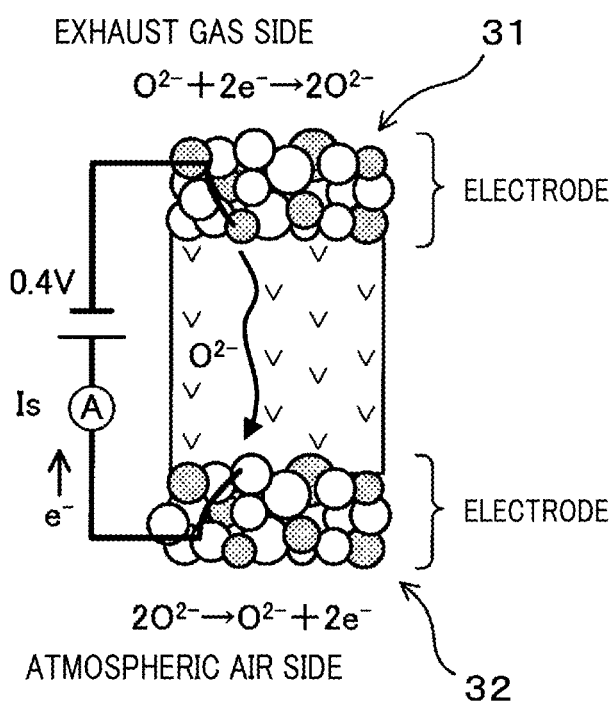
FIG. 9 is an explanatory diagram schematically showing a gas reaction model of the gas sensor element according to the first embodiment.

As shown in FIG. 9, the following gas reaction model can be considered. In this model, a reaction $O_2+2e^- \rightarrow 2O^{2-}$ occurs on the measurement electrode film 31 side. The produced $O^{2-}$ moves through the solid electrolyte body 20 to the reference electrode film 32 side. Then, a reaction $2O^{2-} \rightarrow O_2+2e^-$ occurs on the reference electrode film 32 side. As a result, a sensor output current Is flows. In addition, when this gas reaction model is replaced with an equivalent circuit, an equivalent circuit model such as that shown in FIG. 10 is obtained.

Figure 10:
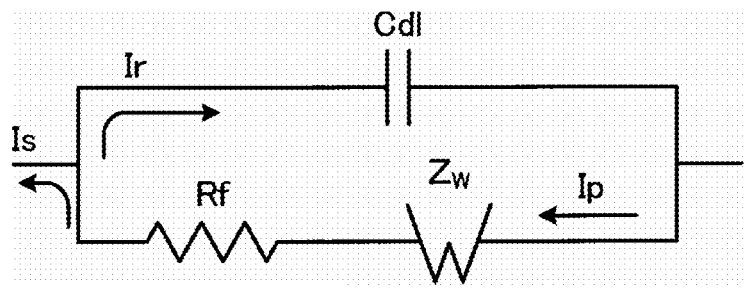
FIG. 10 is an explanatory diagram showing an equivalent circuit model during changes in the gas composition in the gas reaction model in FIG. 9.

Here, in the equivalent circuit model in FIG. 10, Cdl is capacitance that is a capacitor component of an electrode reaction. Rf is an interface resistance in an electrode film. Zw is gas diffusion resistance. Ip is an oxygen pumping current. Is is a sensor output current. Ir is a reverse current. Based on the equivalent circuit model in FIG. 10, during changes in a gas composition, the gas diffusion resistance Zw changes. Thus, the reverse current Ir flows to the capacitance Cdl that is the capacitor component of the electrode reaction. Due to the reverse current Ir, charging/discharging occurs in the capacitor component. The responsiveness of the gas sensor 1 during changes in the gas composition worsens as time required for the charging/discharging in the capacitor component increases.

However, when the distribution structure is provided as described above, the average thickness of the mixed region 313 is large in the first region 315 that is effective for electrode activity, and the average thickness of the mixed region 313 is small in the second region 316 that is in the vicinity thereof. Therefore, the capacitance of the overall measurement electrode film 31 can be reduced. Therefore, the charging/discharging of the capacitor component during changes in the gas composition of the overall measurement electrode film 31 is quickly performed. As a result, the responsiveness of the gas sensor 1 during changes in the gas composition is assumed to be improved.

Figure 11A:
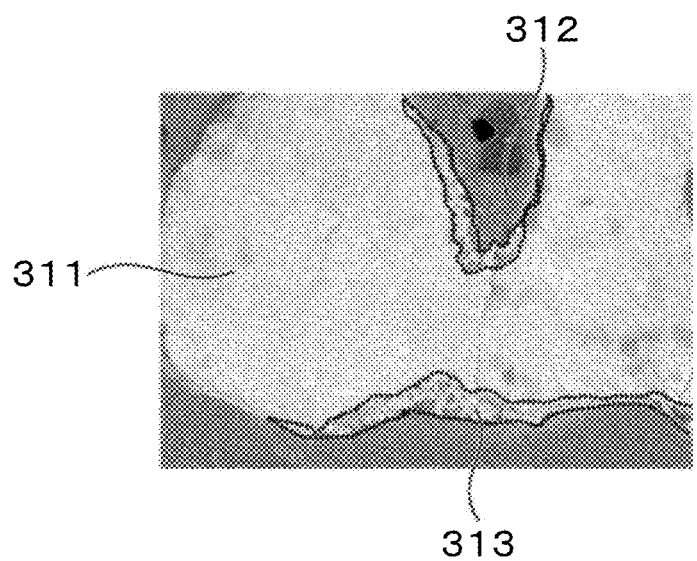
FIG. 11A is a scanning electron microscope image showing the mixed region within the first region of the measurement electrode film and FIG. 11B is a scanning electron microscope image showing the mixed region within the second region of the measurement electrode film.
Figure 11B:
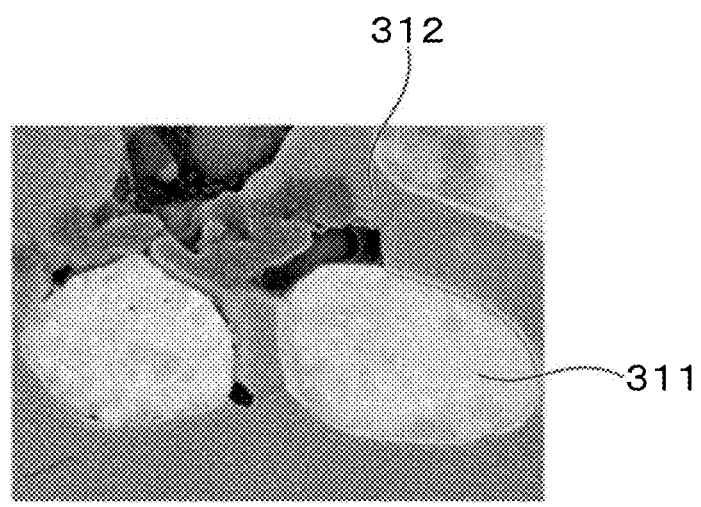

An aspect of the distribution structure is shown in FIGS. 11A and 11B by SEM images of an actual measured-gas-side electrode film. FIG. 11A shows a mixed region state near the measured-gas intake port 15 in the first region 315. FIG. 11B shows a mixed region state in a region closer to the center $O_1$ than the first region 315 is. As is clear from FIGS. 11A and 11B, the mixed regions 313 are numerous and formed having a large thickness near the measured-gas intake port 15. The mixed regions 313 are hardly formed on the side further towards the center $O_1$ than the first region 315 is.

As shown in the example in FIG. 5, the reference electrode film 32 can also have a configuration similar to that of the measurement electrode film 31. That is, the reference electrode film 32 may have the noble metal region 311, the solid electrolyte region 312, and the mixed region 313. The reference electrode film 32 may have the distribution structure in the mixed region 313. Here, even when the reference electrode film 32 does not have a distribution structure, if the measurement electrode film 31 has the above-described distribution structure, the electrode activation time of the gas sensor 1 can be shortened and the responsiveness can be improved. Such desirable effects can be obtained.

As described above, distribution is provided in the thickness of the mixed region 313 of the measurement electrode film 31. As a result, the gas sensor element 10 and the gas sensor 1 that provides both high electrode activity and excellent responsiveness can be provided.

Second Embodiment

Next, the gas sensor element 10 according to a second embodiment will be described. In this embodiment, the measured-gas intake port 15 is provided on a side surface of the gas sensor element 10. Among reference numbers used according to the second and subsequent embodiments, reference numbers that are the same as those used according to a previous embodiment indicate constituent elements and the like that are similar to those according to the previous embodiment, unless otherwise stated. In addition, regarding configurations according to the second and subsequent embodiments, configurations that are not particularly noted, configurations that are not contradictory, and the like are similar to those according to the previous embodiment.

Figure 12:
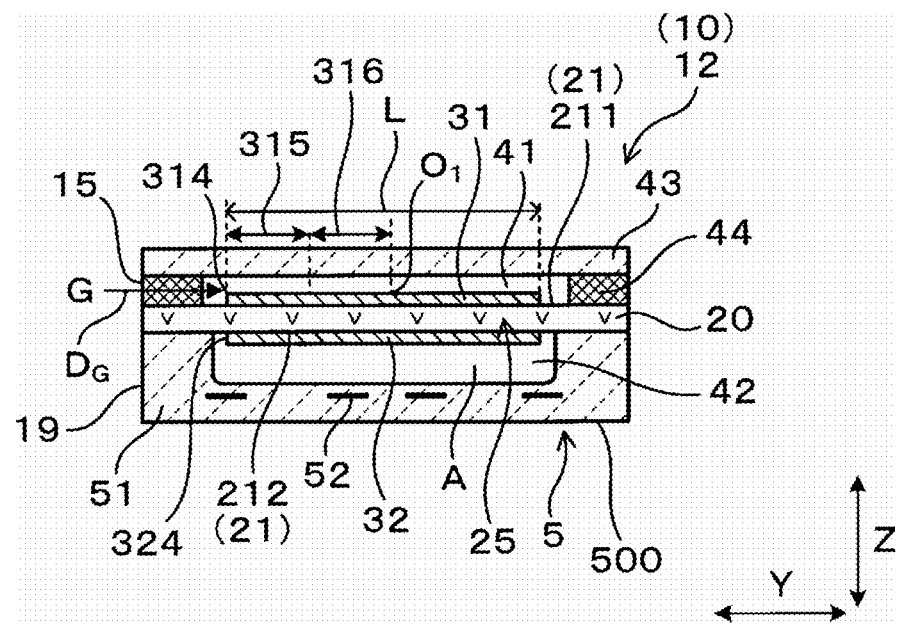
FIG. 12 is a cross-sectional view in the transverse direction of a gas sensor element according to a second embodiment.
Figure 13:
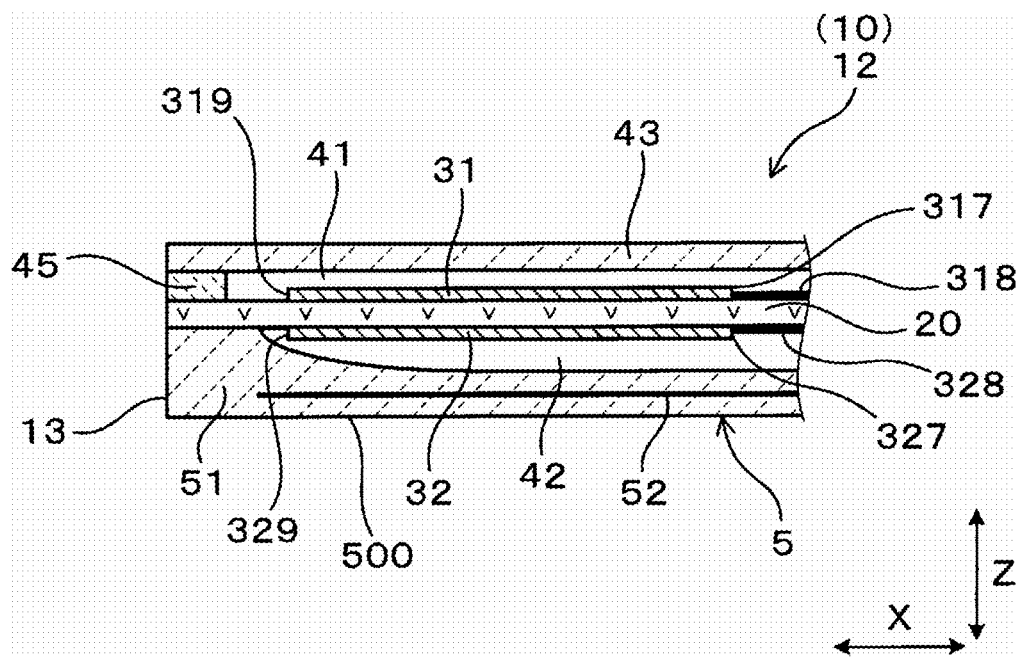
FIG. 13 is a cross-sectional view in the longitudinal direction of the gas sensor element according to the second embodiment.
Figure 14:
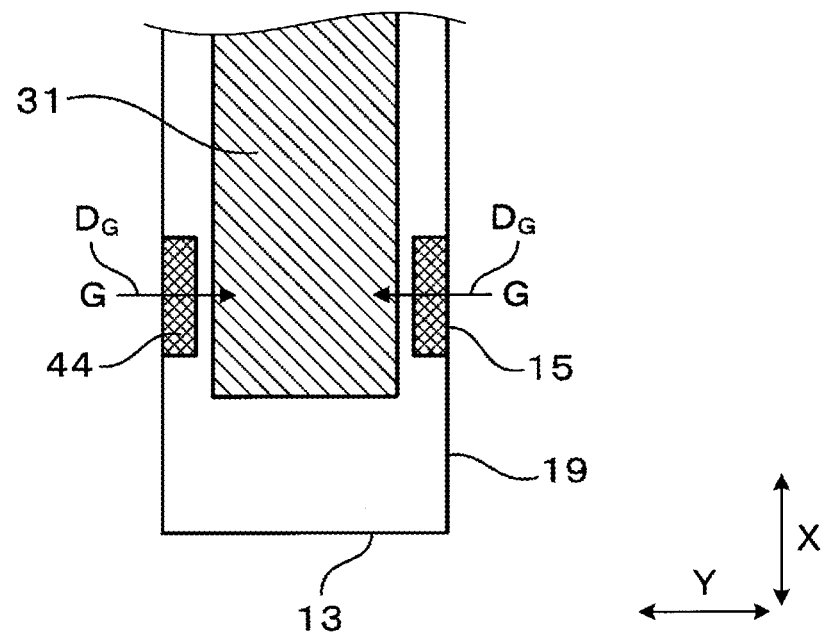
FIG. 14 is a plan view of a measurement electrode film formation surface of a solid electrolyte body in the gas sensor element according to the second embodiment.

As shown in examples in FIGS. 12 to 14, the gas sensor element 10 according to the present embodiment has the measured-gas intake port 15 on a side surface of the plate-shaped gas sensor element 10, that is, in an end portion 19 in the transverse direction Y. FIG. 12 is a cross-sectional view on a plane along the transverse direction Y and the thickness direction Z of the gas sensor element 10, and is also a cross-sectional view on a plane along the lamination direction (that is, the thickness direction Z) of the gas sensor element 10 and the gas intake direction $D_G$. The diffusion resistance layer 44 is formed in the measured-gas intake port 15, and the diffusion resistance layer 44 is formed in the end portion 19 in the transverse direction Y of the gas sensor element 10.

When the measured-gas intake port 15 is formed in an end portion in the transverse direction Y of the gas sensor element 10 as according to the present embodiment, the intake direction DG of the measured gas G is a direction along the transverse direction Y. The measured-gas intake port 15 may be formed on both ends in the transverse direction Y of the gas sensor element 10 or may be formed in either of the two end portions in the transverse direction Y. For example, the measured-gas intake port 15 is formed close to the tip end 13 side in the longitudinal direction X.

In a manner similar to that according to the first embodiment, the measurement electrode film 31 has a distribution structure in a direction along the intake direction $D_G$. Specifically, the measurement electrode film 31 has the first region 315 and the second region 316 that satisfies the relationship $D_1 > D_2$. When the measured-gas intake port 15 is formed in the end portion 19 (that is, the side surface of the gas sensor element 10) in the transverse direction Y of the gas sensor element 10 as according to the present embodiment, the overall length L of the measurement electrode film 31 is a length of the measurement electrode film 31 in the transverse direction Y of the gas sensor element 10.

Because the measured-gas intake port 15 is formed on the side surface, the first region 315 and the second region 316 are formed such as to run along the transverse direction Y. According to the present embodiment, the measured gas G is taken in from the measured-gas intake port 15 that is provided in the end portion 19 in the transverse direction Y of the gas sensor element 10. However, the distribution structure of the mixed region 313 is provided in the direction along the intake direction $D_G$ in a manner similar to that according to the first embodiment. When the measured-gas intake port 15 is provided on both ends in the transverse direction, the distribution structure can be formed in each of the measured-gas intake ports 15.

For example, two distribution structures can be formed within the measurement electrode film 31. From a similar perspective, in the gas sensor element 10 that has a plurality of measured-gas intake ports 15, a plurality of distribution structures along the intake direction $D_G$ can be formed. Other configurations can be similar to those of the first embodiment. The gas sensor element 10 and the gas sensor 1 according to the present embodiment can achieve effects similar to those of the first embodiment.

First Modification

Figure 15:
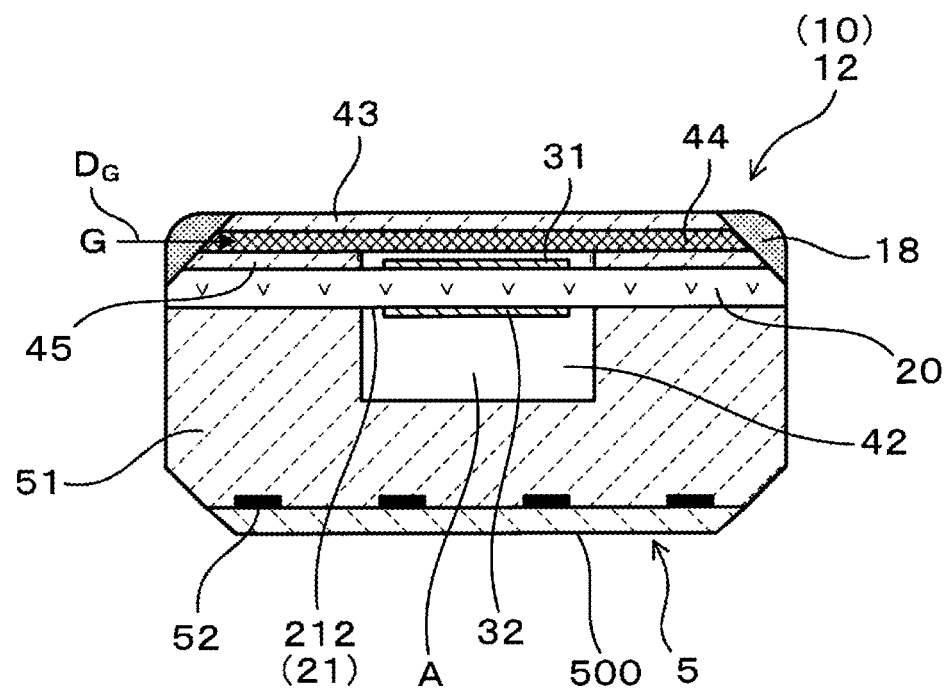
FIG. 15 is a cross-sectional view in the transverse direction of the gas sensor element in a first modification.

A present example is a modification of the gas sensor element in which the measured-gas intake port 15 is formed on the side surface. FIG. 15 is a cross-sectional view on a plane along both the transverse direction Y and the thickness direction Z of the gas sensor element 10, and is also a cross-sectional view on a plane along the lamination direction (that is, the thickness direction Z) of the gas sensor element 10 and the gas intake direction $D_G$.

As shown in an example in FIG. 15, the gas sensor element 10 of the present example includes a measured gas space that is surrounded by the solid electrolyte body 20, the insulating body 45, and the diffusion resistance layer 44. The diffusion resistance layer 44 is formed in a laminated manner such as to oppose a portion of the solid electrolyte body 20 in the thickness direction Z of the gas sensor element 10. A porous protective layer 18 is formed in the measured-gas intake port 15. Toxic components in the measured gas G are trapped by the porous protective layer 18.

In a manner similar to that according to the second embodiment, the intake direction $D_G$ of the measured gas G in the gas sensor element 10 of the present example is the transverse direction Y of the gas sensor element 10. Therefore, the above-described distribution structure is formed in the measurement electrode film 31 along the transverse direction Y of the gas sensor element 10. Thus, effects similar to those according to the first embodiment and the second embodiment can be obtained. Other configurations can be similar to those according to the first embodiment.

Comparison Example

Figure 16:
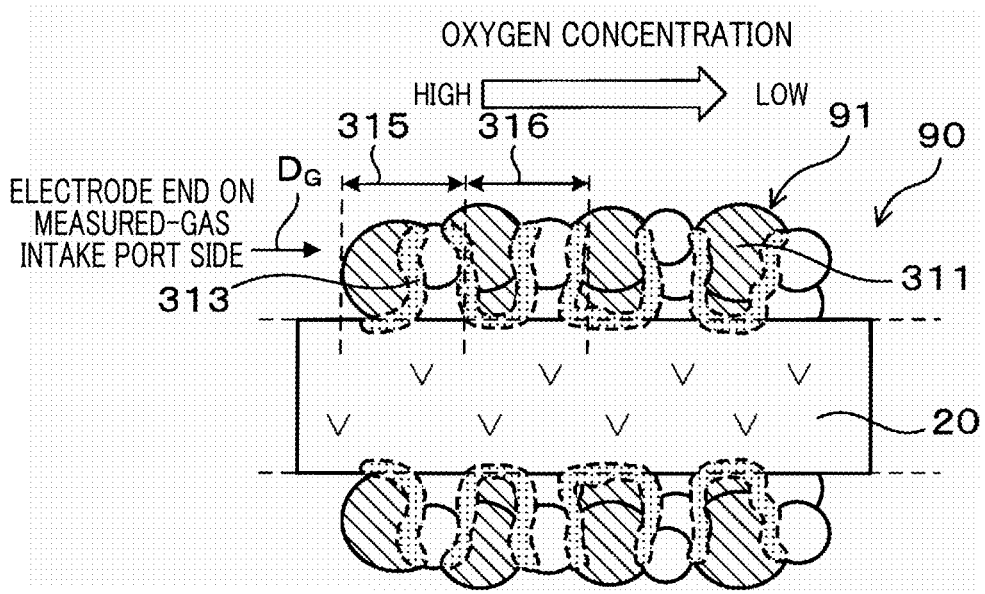
FIG. 16 is an explanatory diagram schematically showing a distribution of a mixed region in a measurement electrode film in a first comparison example.

Next, a gas sensor element 90 that does not have a distribution structure of a mixed region in a measurement electrode film will be described. As shown in an example in FIG. 16, the gas sensor element 90 according to the present embodiment has the mixed region 313 in a measurement electrode film 91. However, the thickness of the mixed region 313 in the direction along the intake direction DG of the measured gas is not small. There is no difference between the average thickness of the mixed region 313 in the above-described first region 315 and the average thickness of the mixed region 313 in the second region 316. As a specific example, a case in which the mixed region 313 is formed at a uniform thickness over the overall measurement electrode film 91 is given.

In the present example, for example, the mixed region 313 in the measurement electrode film 91 is formed at a uniform thickness in the intake direction $D_G$. For example, the mixed region 313 is present with a thickness according to an embodiment that is comparatively larger, even in a region other than the first region 315 in which the oxygen processing amount is low due to oxygen pumping, such as the second region 316. Therefore, the capacitance of the measurement electrode film 91 increases, charging/discharging time during changes in the gas composition becomes long, and the responsiveness of the gas sensor worsens.

Third Embodiment

Next, the gas sensor element 10 according to a third embodiment will be described. In this gas sensor element 10, the positions of the electrode end 324 of the reference electrode film 32 and the electrode end 314 of the measurement electrode film 31 differ on the measured-gas intake port 15 side.

Figure 17:
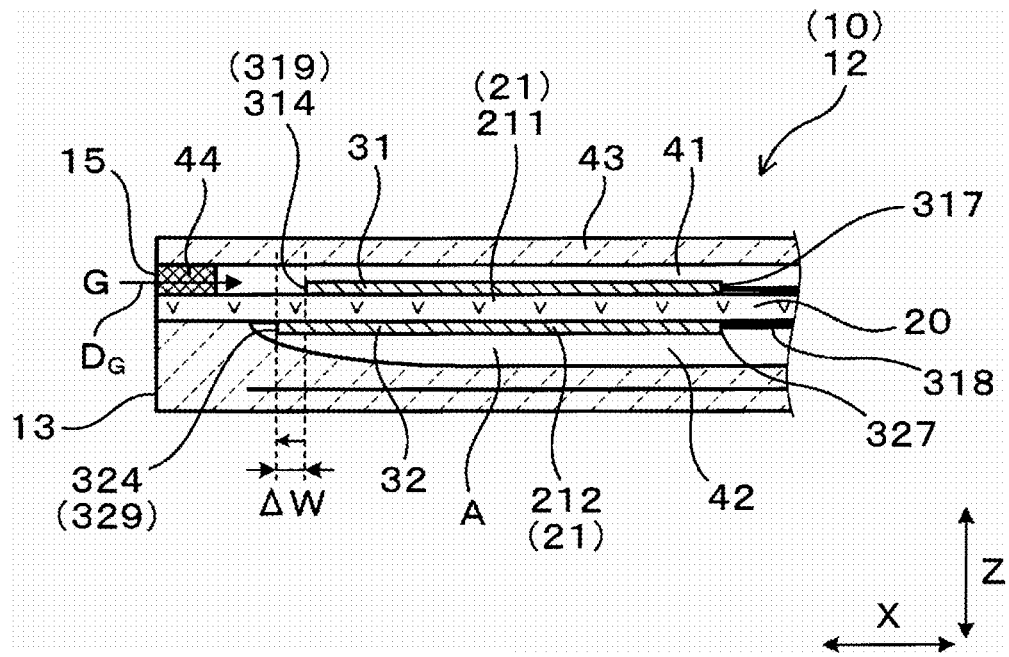
FIG. 17 is a cross-sectional view in the longitudinal direction of a gas sensor element according to a third embodiment.
Figure 18:
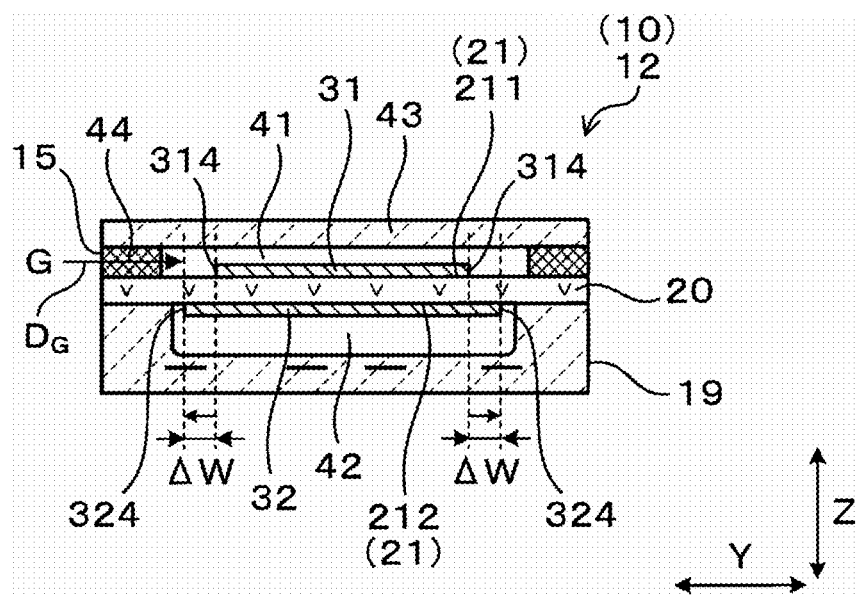
FIG. 18 is a cross-sectional view in the transverse direction of the gas sensor element according to the third element.

As shown in examples in FIGS. 17 and 18, in the gas sensor element 10 according to a present embodiment, the electrode end 324 on the measured-gas intake port 15 side of the reference electrode film 32 is arranged closer to the measured-gas intake port 15 than the electrode end 314 on the measured-gas intake port 15 side of the measurement electrode film 31 is. That is, the electrode end 324 on the measured-gas intake port 15 side of the reference electrode film 32 is provided such as to extend further towards the measured-gas intake port 15 side than the electrode end 314 on the measured-gas intake port 15 side of the measurement electrode film 31 is.

As shown in the example in FIG. 17, when the measured-gas intake port 15 is provided on the tip end 13 side of the gas sensor element 10, the electrode end 324 on the measured-gas intake port 15 side of the reference electrode film 32 is provided such as to extend closer to the tip end 13 of the gas sensor element 10 than the electrode end 314 on the measured-gas intake port 15 side of the measurement electrode film 31 is.

As shown in the example in FIG. 18, when the measured-gas intake port 15 is provided on the side surface (that is, in the end portion 19 in the transverse direction Y) of the gas sensor element 10, the electrode end 324 on the measured-gas intake port 15 side of the reference electrode film 32 is provided such as to extend closer to the side surface 19 of the gas sensor element 10 than the electrode end 314 on the measured-gas intake port 15 side of the measurement electrode film 31 is. In either case, a deviation width $\Delta W$ is present between the electrode end 314 of the measurement electrode film 31 and the electrode end 324 of the reference electrode film 32.

In a configuration according to the present embodiment, the energization process is performed between the measurement electrode film 31 and the reference electrode film 32. Thus, a current distribution is concentrated on the electrode end 314 on the measured-gas intake port 15 side of the measurement electrode film 31. Due to this current concentration, a reduction reaction amount on the electrode end 314 on the measured-gas intake port 15 side of the measurement electrode film 31 increases more than in a vicinity thereof. As a result, the mixed region 313 is formed with a larger thickness than in the other regions, on the electrode end 314 on the measured-gas intake port 15 side of the measurement electrode film 31. Therefore, in the configuration according to the present embodiment, the above-described distribution structure of the mixed region 313 can be formed by the energization process.

Fourth Embodiment

Figure 19:
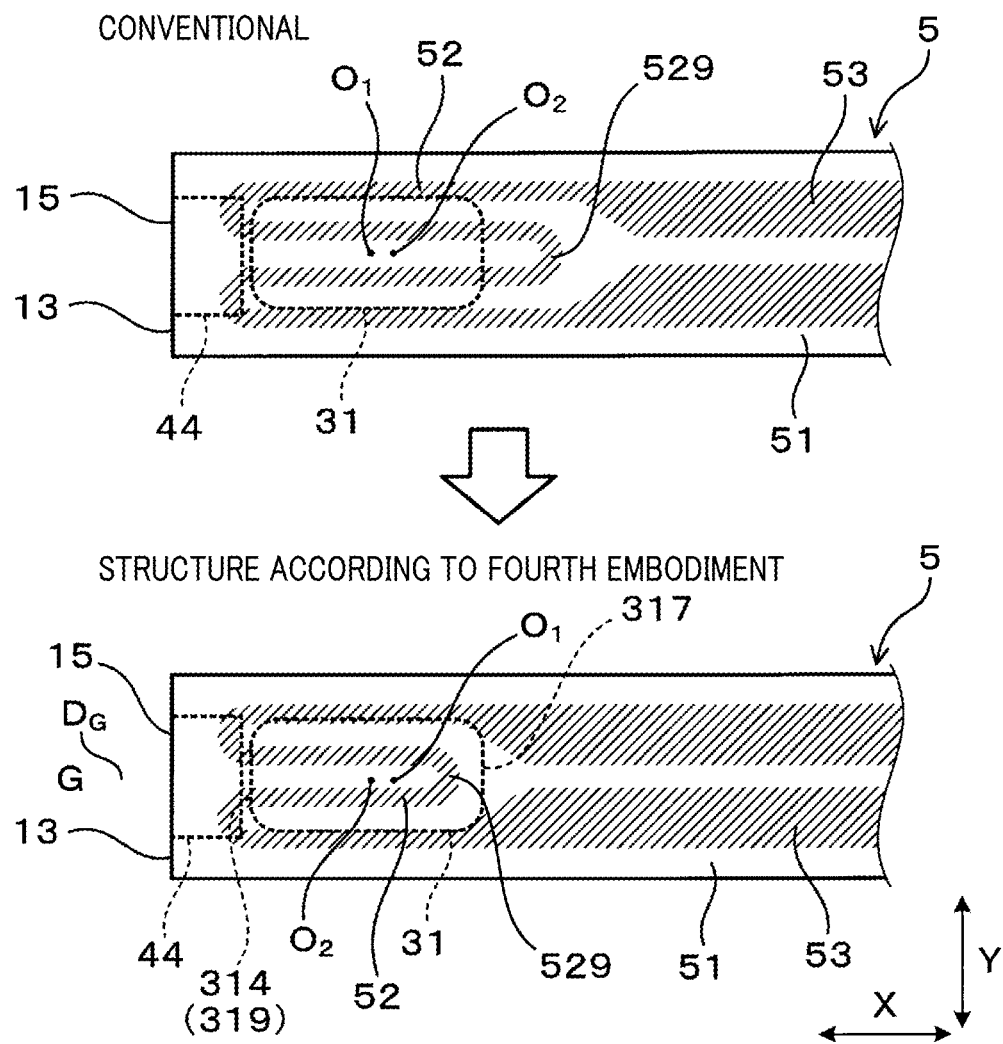
FIG. 19 is a plan view in which a diffusion resistance layer and a measurement electrode film are projected onto a heat generating body formation surface of a heater in a gas sensor element that has a measured-gas intake port on a tip end, according to a fourth embodiment.
Figure 20:
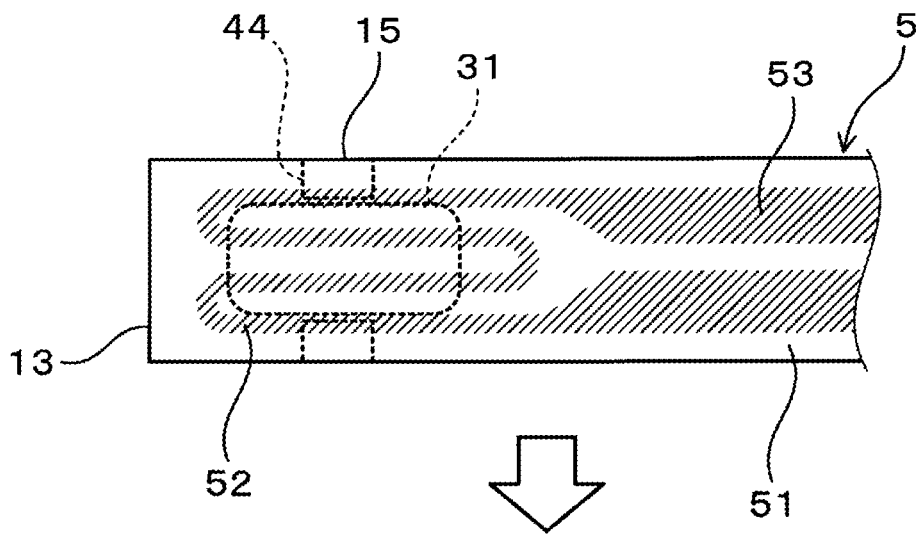
FIG. 20 is a plan view in which a diffusion resistance layer and a measurement electrode film are projected onto a heat generating body formation surface of a heater in a gas sensor element that has a measured-gas intake port on a side surface, according to the fourth embodiment.
Figure 20:
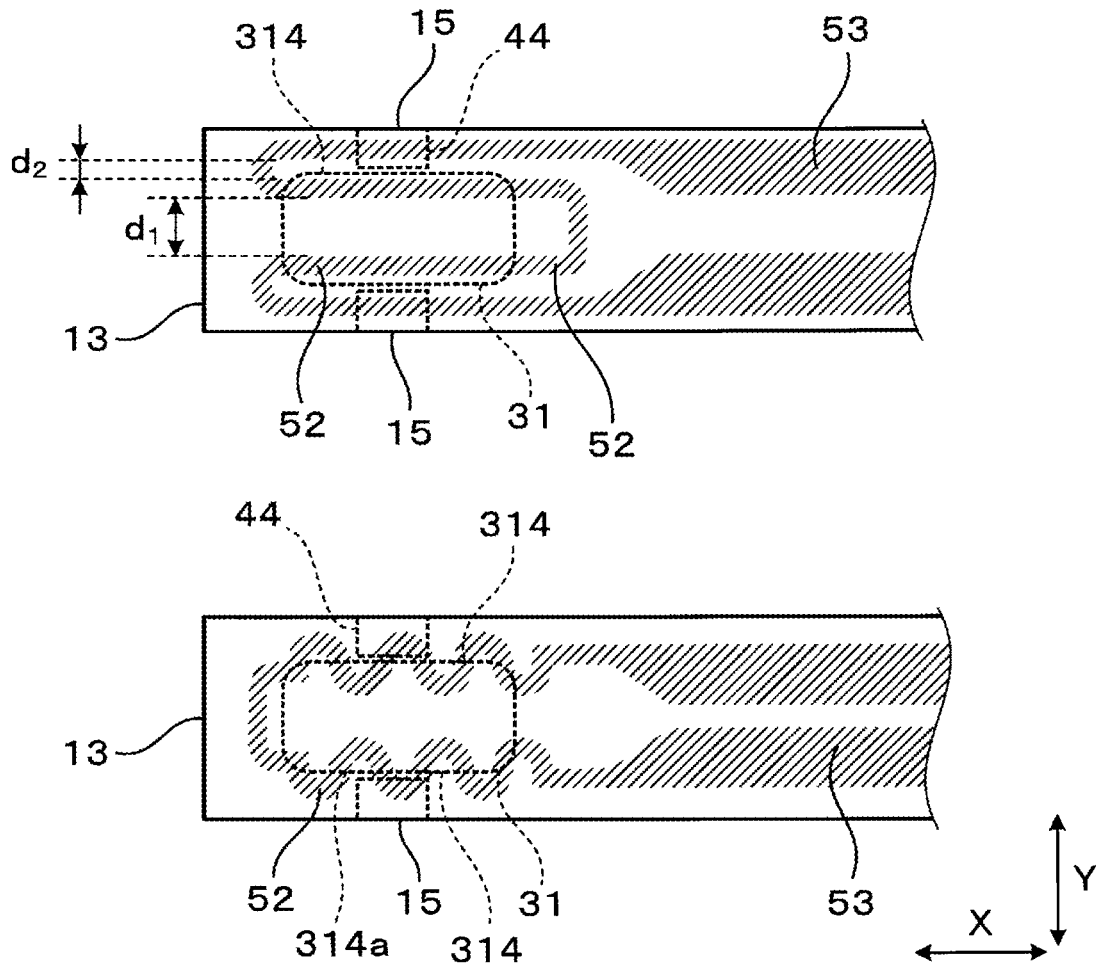

Next, the gas sensor element 10 according to a fourth embodiment will be described. This gas sensor element 10 is configured such that a highest temperature position in the heat generation distribution in the measurement electrode film 31 is closer to the measured-gas intake port 15 than the center $O_1$ of the measurement electrode film 31 is. FIGS. 19 and 20 show diagrams in which the diffusion resistance layer 44 and the measurement electrode film 31 are projected in the thickness direction Z onto a heat generating body formation surface of the heater 5 in the gas sensor element.

The gas sensor element 10 includes the heater 5 that heats the gas sensor element 10. The heater 5 has the heat generating body 52, a lead portion 53 that energizes the heat generating body 52, and the ceramic substrate 51 in which the heat generating body 52 and the lead portion 53 are embedded. The heat generating body 52 is formed by an electrode pattern that is formed by printing on the ceramic substrate 51. The highest temperature position in the heat generation distribution can be adjusted by a shape of the heat generating body 52. The heat generating body 52 is typically formed in a shape of a wave that has an amplitude in the longitudinal direction X of the gas sensor element 10.

As shown in an example in FIG. 19, a conventional heat generating body 52 is formed by a wave-shaped repeating pattern that has a large amplitude that exceeds a formation range of the measurement electrode film 31 in the longitudinal direction X. When the measured-gas intake port 15 is on the tip end 13 of the gas sensor element 10, the highest temperature position in the heat generation distribution may be set to be closer to the measured-gas intake port 15 of the measurement electrode film 31.

To set the highest temperature position in the heat generation distribution, for example, an amplitude end 529 on the base end side of the wave-shaped heat generating body 52 may be set closer to the tip end 13 than the electrode end (that is, the second electrode end 317) on the side opposite to the electrode end 314 (that is, the first electrode end 319) on the tip end 13 side of the measurement electrode film 31 is. Alternatively, a center position $O_2$ in the intake direction $D_G$ of the heat generating body 52 may be arranged closer to the tip end 13 than the center position $O_1$ in the intake direction $D_G$ of the measurement electrode film 31 is. Here, the center position $O_2$ is a center position in the intake direction $D_G$ of the repeating pattern.

When the measured-gas intake port 15 is on the side surface of the gas sensor element 10, the conventional heat generating body 52 is formed by a large, wave-shaped repeating pattern that exceeds a formation range of the measurement electrode film 31 in the transverse direction Y.

When the measured-gas intake port 15 is on the side surface of the gas sensor element 10, to set the highest temperature position in the heat generation distribution closer to the measured-gas intake port 15 of the measurement electrode film 31, as shown in an example in FIG. 20, for example, spacings $d_1$ and $d_2$ in the wave-shaped repeating pattern may be narrowed on the measured-gas intake port 15 side. Specifically, spacings in the wave-shaped repeating pattern that has an amplitude in the longitudinal direction X are made non-uniform, and the spacing $d_2$ on the measured-gas intake port 15 side is made smaller than the spacing $d_1$ in a center position in the transverse direction Y.

In addition, as shown in the example in FIG. 20, for example, the heat generating body 52 may be formed by a wave-shaped repeating pattern that has an amplitude in the transverse direction Y, and a wave-shaped repeating pattern that has an amplitude that sandwiches the electrode end 314 (specifically, a projection line 314*a* thereof) on the measured-gas intake port 15 side of the measurement electrode film 31 may be formed. The projection line 314*a* is a virtual line that is formed when the measurement electrode film 31 is projected onto a formation surface of the heat generating body 52 in the thickness direction Z of the gas sensor element 10.

In this manner, a formation pattern of the heat generating body 52 is changed. As a result, the highest temperature position in the heat generation distribution in the measurement electrode film 31 can be set closer to the measured-gas intake port 15 than the center $O_1$ of the measurement electrode film 31 is. Thus, when the heater 5 generates heat by energization, the distribution structure of the mixed region 313 is formed.

The formation of the mixed region 313 by energization heat generation occurs in the following steps (1) to (3):
(1) Reduction of the solid electrolyte due to energization heat generation of the heater;
(2) Formation of a solid solution state by mutual diffusion of the reduced solid electrolyte and the noble metal; and
(3) Formation of the mixed region 313 by the reduced solid electrolyte being oxidized.

Therefore, if there is a state where a sufficient reduction amount is present at step (1), the amount of mixed region 313 is determined by a solid solution amount at step (2). The amount of mixed region 313 increasing means that the thickness increases.

According to the present embodiment, the highest temperature position in the heat generation distribution in the measurement electrode film 31 is set closer to the measured-gas intake port 15 than the center $O_1$ of the measured-gas intake port 15 is. As a result, a high temperature region of the measurement electrode film 31 is set close to the measured-gas intake port 15. A reduction potential decreases in the high temperature region. Thus, the reduction amount of the solid electrolyte increases. A mutual diffusion speed also increases, and the solid solution amount increases. Due to the increase in the reduction amount and the solid solution amount, the thickness of the mixed region 313 is formed to be thick, on the measured-gas intake port 15 side of the measurement electrode film 31 that is the high temperature region.

The heat generation distribution of the measurement electrode film 31 and the highest temperature position therein are measured by thermography. Regarding the thermography, a TH9100PMV manufactured by NEC Corporation is used. Specifically, a temperature distribution of a heater surface of the gas sensor element 10 is measured by line analysis. The heater surface refers to an outer surface 500 of the gas sensor element that is closest to the heater 5 that is provided inside the gas sensor element 10 and parallel to the lamination direction (that is, the thickness direction Z). An analysis position for the line analysis is performed along the intake direction including the measured-gas intake port, and performed over a range in which the measurement electrode film 31 is projected onto the heater surface.

Here, the temperature distribution on the heater surface coincides with the heat generation distribution in the measurement electrode film 31. Therefore, a highest temperature position in the temperature distribution on the heater surface is the highest temperature position in the heat generation distribution in the measurement electrode film 31. The highest temperature position in the heat generation distribution can be determined in this manner.

In addition, in the configuration shown in the example in FIG. 19, the following effects can further be obtained. The highest temperature position in the heat generation distribution in the measurement electrode film 31 is set closer to the measured-gas intake port 15 that is provided on the tip end 13 in the longitudinal direction X of the gas sensor element 10. In this case, compared to when the measured-gas intake port 15 is formed on the side surface for example, directivity of a flow of measured gas G such as the exhaust gas can be reduced.

In addition, in the gas sensor element 10, to effectively detect the measured gas G that is taken in from the tip end 13, a structure may be that in which the gas measuring portion 12 that includes a sensor cell is arranged on the tip end 13 side of the gas sensor element 10 and heat is generated in a concentrated manner on the tip end 13 side of the element. In such a structure, a length in the longitudinal direction X of the gas sensor element 10 can be shortened. Therefore, the gas sensor 1 can be shortened, and an installation space can be made smaller. As a result, adaptation to future mounting environments of the gas sensor 1 in which exhaust gas pipes tend to become complex becomes possible.

In addition, typically, when the gas sensor element 10 is shortened, the gas sensor element 10 is easily affected by surrounding ambient temperature outside the gas sensor element 10, and it becomes difficult to suppress occurrence of a sink mark due to heat. However, the highest temperature position in the heat generation distribution in the measurement electrode film 31 is set to be closer to the tip end 13 in the longitudinal direction X of the gas sensor element 10.

Thus, the vicinity of the measured-gas intake port 15 can be preferentially heated in a concentrated manner. Therefore, the temperature near the measured-gas intake port 15 is not easily affected by the ambient temperature. That is, the temperature near the measured-gas intake port 15 is not easily affected by occurrence of a sink mark due to heat caused by changes in the ambient temperature, and an active state can be stably maintained.

First Experiment Example

In a present example, relationships between the average thicknesses of the mixed regions 313 in the first region 315 of the measurement electrode film 31 and in the overall measurement electrode film 31, and the electrode activation time and the responsiveness are compared and evaluated. First, the measurement method for the average thickness of the mixed region 313 by image analysis will be described.

Reflection electron images (that is, back-scattered electron [BSE] images) of cross-sections of the measurement electrode film 31 in measurement target regions such as the first region 315 and the second region 316 are obtained by a scanning electron microscope. An actual measurement region in the BSE image is a region that has a width of 2.5 μm and a length in the thickness direction Z of 4 μm. For example, magnification of the scanning electron microscope is 30,000 times.

Figure 21:
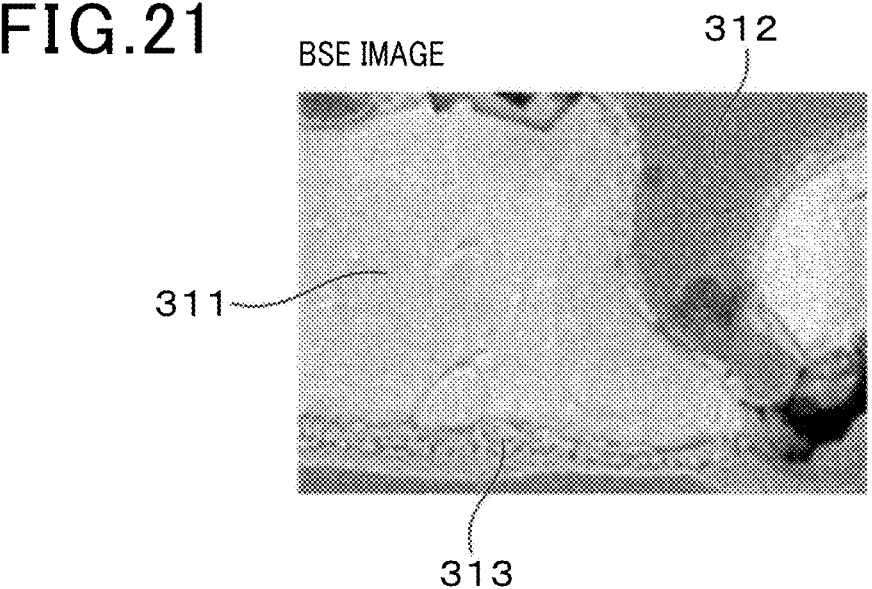
FIG. 21 is a scanning electron microscope image showing a measurement electrode film in a first experiment example.
Figure 22:
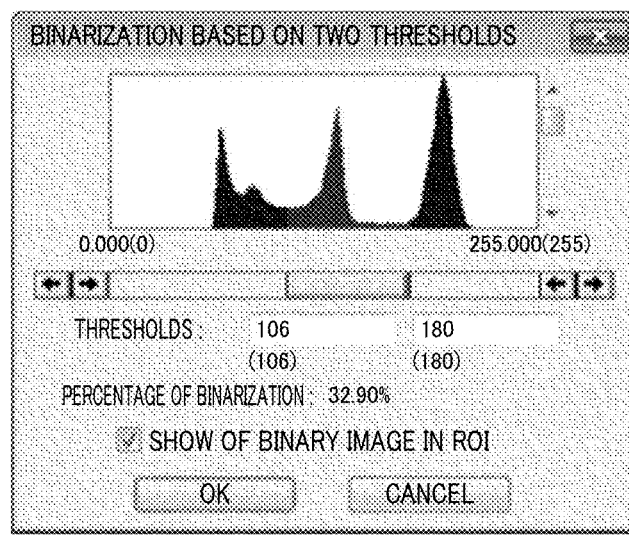
FIG. 22 is a diagram showing settings for binarization based on luminance thresholds in the first experiment example.
Figure 23:
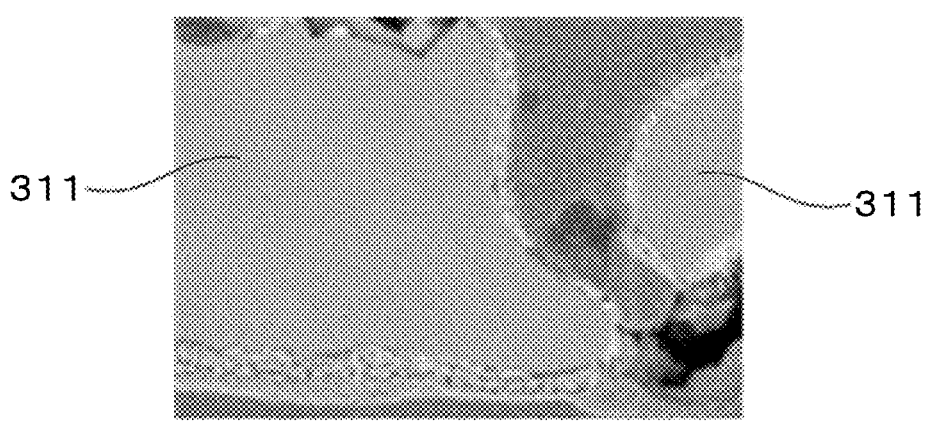
FIG. 23 is a scanning electron microscope image showing a noble metal region that is binarized based in luminance in the first experiment example.
Figure 24:
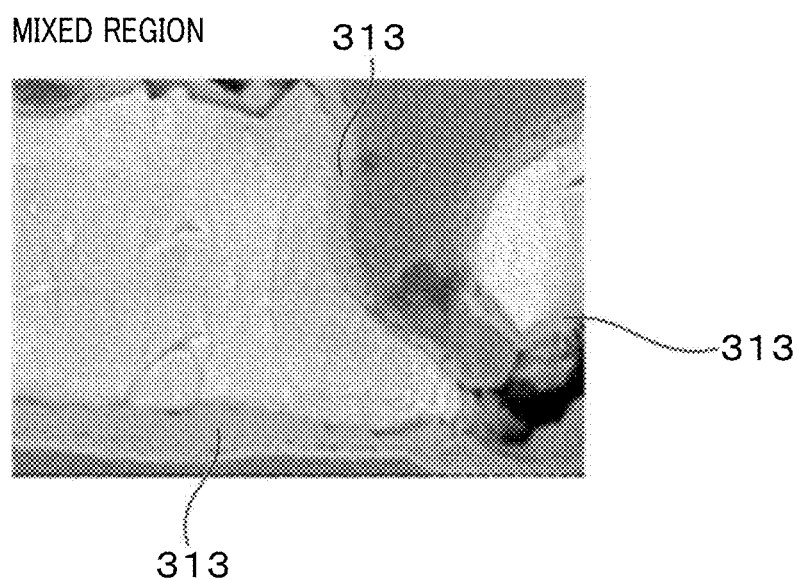
FIG. 24 is a scanning electron microscope image showing a mixed region that is binarized based on luminance in the first experiment example.

FIG. 21 shows an example of the BSE image. In the present example, an SU8220 manufactured by Hitachi High-Technologies Corporation was used as the scanning electron microscope. Next, the BSE image was separated into the noble metal region 311 and the mixed region 313 based on luminance. Specifically, separation is performed by binarization based on luminance. As shown in an example in FIG. 22, the noble metal region 311 and the mixed region 313 are clearly differentiated by luminance. A BSE image of the noble metal region 311 after separation is shown in FIG. 23. A BSE image of the mixed region 313 is shown in FIG. 24.

A circumference L1 of the noble metal region 311 is calculated based on the BSE image of the noble metal region 311. The circumference L1 is a circumference (unit: μm/μm2) of the noble metal region 311 per unit cross-sectional area. In addition, an area S1 of the mixed region 313 is calculated based on the BSE image of the mixed region 313. The area S1 is an area (unit: μm2/μm2) of the mixed region 313 per unit cross-sectional area. The circumference L1 and the area S1 are measured by image analysis of the BSE images after separation.

The analysis software WinROOF manufactured by MITANI Corporation was used for image analysis. An average thickness DS of the mixed region 313 within the measurement region is calculated based on expression 1, below, from the circumference L1 and the area S1. The above-described average thickness DS is calculated for each of a total of five measurement regions within the measurement target region. An arithmetic mean value of the average thicknesses DS of the measurement regions is the average thickness of the mixed region 313 in the measurement target region.

$$DS=S1/L1 \qquad \text{Expression 1}$$

A plurality of gas sensors 1 that include the gas sensor elements 10 of which the first average thickness $D_1$ of the mixed region 313 in the first region 315 from the electrode end 314 on the measured-gas intake port 15 side of the measurement electrode film 31 to ¼ of the overall length L of the measurement electrode film differs were prepared, and an activation time when the oxygen concentration in the measured gas G is measured by each gas sensor 1 was determined.

Specifically, a voltage was applied to the heater 5 of the gas sensor element 1 and the heater 5 was made to generate heat. With a sensor output value at a control temperature as a reference, an amount of time until an output value that is 50% of the reference is obtained was measured. Here, the first average thickness $D_1$ is an average thickness of the mixed region 313 when the above-described measurement target region is the first region 315.

Figure 25:
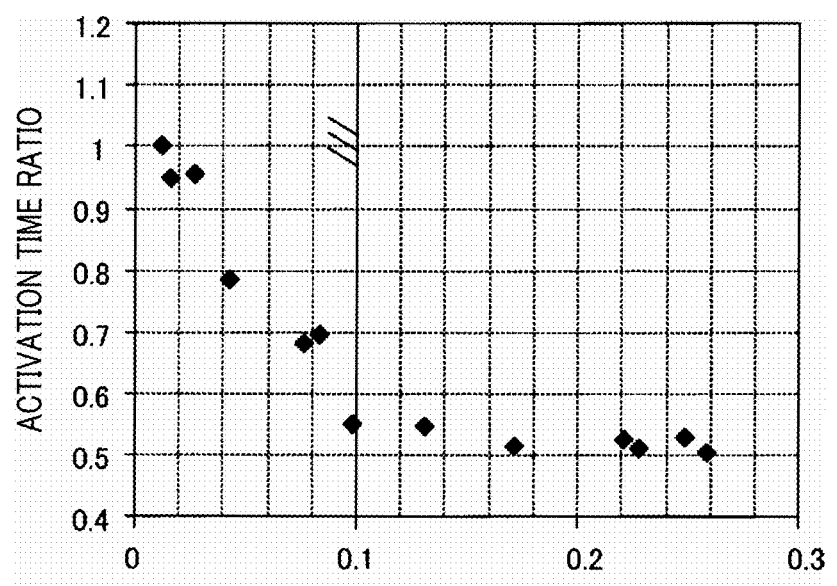
FIG. 25 is a graph showing a relationship between a first average thickness of the mixed region in the first region and an activation time ratio of the gas sensor in the first experiment example.

An activation time ratio is a ratio of the activation time of the gas sensor 1 to an activation time of a gas sensor in which the average thickness of the mixed region 313 in the first region 315 is 0.01 μm. A relationship between the first average thickness $D_1$ of the mixed region 313 in the first region 315 and the activation time ratio is shown in FIG. 25.

In addition, a plurality of gas sensors 1 that include the gas sensor elements 10 of which the average thickness $D_3$ of the mixed region 313 within the measurement electrode film 31 differs were prepared, and the responsiveness of each gas sensor 1 was evaluated. The third average thickness $D_3$ is an average thickness of the mixed region 313 in the overall measurement electrode film 31. That is, the third average thickness $D_3$ is an average thickness of the mixed region 313 when the above-described measurement target region is the overall measurement electrode film 31. The third average thickness $D_3$ is measured by the above-described five measurement regions being determined from a cross-section in the intake direction $D_G$ of the measurement electrode film 31.

In determining the measurement regions, the measurement regions are determined without bias from not only the end portion on the measured-gas intake port 15 side, but also the center of the measurement electrode film 31 in the intake direction $D_G$, an area between the end portion on the measured-gas intake port 15 side and the center of the measurement electrode film 31, and the like.

The responsiveness of the gas sensor 1 was evaluated imbalance responsiveness being measured when the gas sensor 1 measures the oxygen concentration in the measured gas G The imbalance responsiveness is expressed by a ratio (A2/A1) of an amplitude A1 of a theoretical air-fuel ratio (A/F) that is based on changes in the oxygen concentration in the measured gas G supplied to the gas sensor 1 and an amplitude A2 of an air-fuel ratio that is actually outputted by the gas sensor 1, and expresses a speed of response to determine an imbalance that is a difference in the air-fuel ratios that occurs between cylinders of the engine.

An imbalance ratio was calculated from a ratio of the activation time of each gas sensor 1 to the imbalance responsiveness of a gas sensor in which the average thickness of the mixed region 313 within the measurement electrode film 31 is 0.01 μm. A relationship between the average thickness $D_3$ of the mixed region 313 within the measurement electrode film 31 and the imbalance ratio is shown in FIG. 26.

As is clear from FIG. 25, the first average thickness $D_1$ of the mixed region 313 in the first region 315 affects the activation time. It is clear that the activation time ratio decreases, as average thickness $D_1$ is increased. As shown in FIG. 25, the first average thickness $D_1$ is set to 0.1 μm or greater. As a result, the activation time can be significantly shortened.

Figure 26:
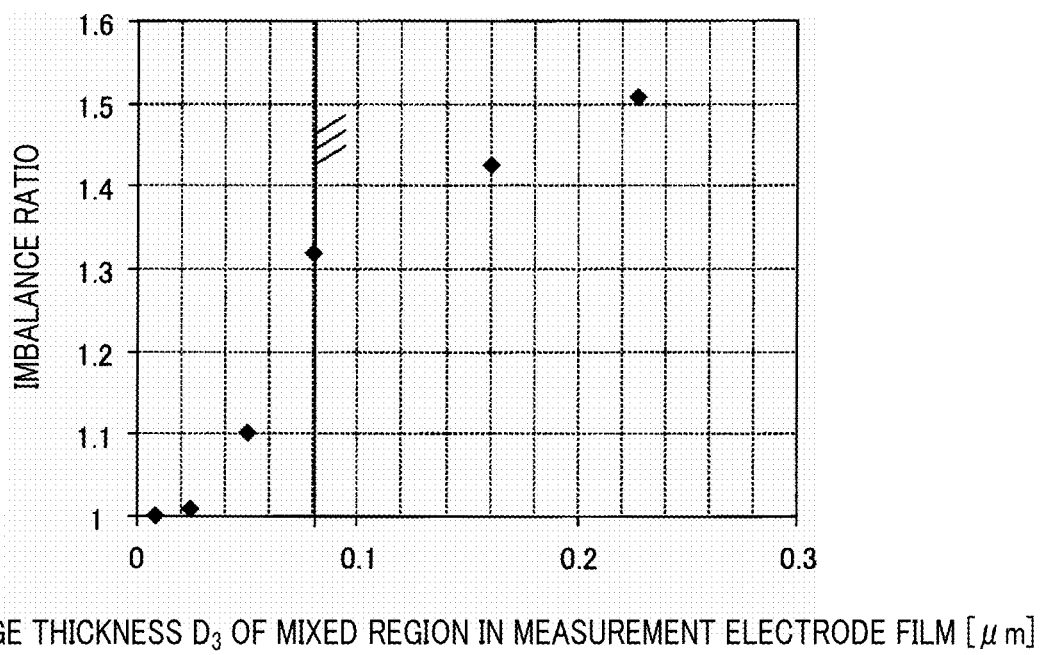
FIG. 26 is a graph showing a relationship between a third average thickness of the mixed region in the overall measurement electrode film and an imbalance ratio of the gas sensor in the first experiment example.

As is clear from FIG. 26, the third average thickness $D_3$ of the mixed region 313 affects the imbalance responsiveness. It is clear that the responsiveness is improved, as the third average thickness $D_3$ is decreased. As shown in FIG. 26, the third average thickness $D_3$ is set to 0.08 μm or less. As a result, the responsiveness can be significantly improved.

The present disclosure is not limited to the above-described embodiments. Various modifications are possible without departing from the spirit of the disclosure. For example, in the gas sensor element 10 according to an embodiment, the solid electrolyte body 20, the measurement electrode 31, and the reference electrode film 32 form a sensor cell 25 (see FIG. 2 and FIG. 12). A specific gas in the measured gas G can be detected by the oxygen pumping reaction of the sensor cell 25. The gas sensor element 10 can further include a pump cell (not shown).

The pump cell is formed by a solid electrolyte body and a pair of pump electrodes that are formed in the solid electrolyte body. The pump electrode can be formed in the same solid electrolyte body as the sensor cell 25. However, the pump electrode may also be formed in a solid electrolyte body (not shown) that is provided separately from the solid electrolyte body 20 that configures the sensor cell 25. In this case, the gas sensor element has the first solid electrolyte body 20 that forms the sensor cell and a second solid electrolyte body (not shown) that forms the pump cell.

Even in the sensor element that has the pump cell, the distribution structure of the mixed region 313 is formed in the measurement electrode film 31. As a result, the electrode activation time is shortened, and responsiveness is improved. Such effects can be obtained. The pump electrode is not necessarily required to have the distribution structure of the mixed region. However, the distribution structure may be formed in the pump electrode.

The present disclosure is described based on the embodiments. However, it is understood that the present disclosure is not limited to the embodiments and constructions. The present disclosure is intended to cover various modifications and examples within the range of equivalency. In addition, various combinations and configurations, and further, other combinations and configurations including more, less, or only a single element thereof are also within the spirit and scope of the present disclosure.

What is claimed is:

1. A gas sensor element comprising:
a solid electrolyte body;
a measurement electrode film that is formed on a main surface of the solid electrolyte body and exposed to a measured gas; and
a measured-gas intake port into which the measured gas is introduced, wherein
the measurement electrode film has a noble metal region that includes a noble metal, a solid electrolyte region that includes a solid electrolyte, and a mixed region in which the noble metal and the solid electrolyte are mixed together, and
the measurement electrode film has a structure in which a first average thickness of the mixed region that is present within a first region from an electrode end on a measured-gas intake port side to ¼ of an overall length of the measurement electrode film in a direction along an intake direction of the measured gas is greater than a second average thickness of the mixed region that is present within a second region that is closer to a center of the measurement electrode film than the first region in the direction along the intake direction is.

2. The gas sensor element according to claim 1, wherein:
the first average thickness of the mixed region within the first region is larger than a third average thickness of the mixed region that is present in the measurement electrode film.

3. The gas sensor element according to claim 2, wherein:
the first average thickness of the mixed region within the first region is equal to or greater than 0.1 micrometers.

4. The gas sensor element according to claim 3, wherein:
the third average thickness of the mixed region that is present in the measurement electrode film is equal to or less than 0.08 micrometers.

5. The gas sensor element according to claim 4, wherein:
the main surface is a first main surface, the solid electrolyte body has a second main surface that is positioned on a side opposite to the first main surface, a reference electrode film that is exposed to a reference gas is formed on the second main surface, and an electrode end on a measured-gas intake port side of the reference electrode film is arranged closer to the measured-gas intake port than the electrode end on the measured-gas intake port side of the measurement electrode film is.

6. The gas sensor element according to claim 5, wherein:
the gas sensor element further includes a heater that heats the gas sensor element; and
the heater is configured such that a highest temperature position in a heat generation distribution in the measurement electrode film is closer to the measured-gas intake port than the center of the measurement electrode film is in the direction along the intake direction.

7. The gas sensor element according to claim 6, wherein:
the gas sensor element includes
a measured gas space into which the measured gas is introduced from the measured-gas intake port,
a reference-gas intake port into which the reference gas is introduced, and
a reference gas space into which the reference gas is introduced from the reference gas intake port;
the solid electrolyte body is arranged between the measured gas space and the reference gas space, the first main surface of the solid electrolyte body faces the measured gas space, and the second main surface faces the reference gas space; and
the gas sensor element has a shape that is elongated in a longitudinal direction, the measured-gas intake port is formed in a tip end in the longitudinal direction of the gas sensor element, and the reference-gas intake port is formed on a side opposite to the tip end in the longitudinal direction.

8. The gas sensor element according to claim 2, wherein:
the third average thickness of the mixed region that is present in the measurement electrode film is equal to or less than 0.08 micrometers.

9. The gas sensor element according to claim 1, wherein:
the first average thickness of the mixed region within the first region is equal to or greater than 0.1 micrometers.

10. The gas sensor element according to claim 1, wherein:
the main surface is a first main surface, the solid electrolyte body has a second main surface that is positioned on a side opposite to the first main surface, a reference electrode film that is exposed to a reference gas is formed on the second main surface, and an electrode end on a measured-gas intake port side of the reference electrode film is arranged closer to the measured-gas intake port than the electrode end on the measured-gas intake port side of the measurement electrode film is.

11. The gas sensor element according to claim 10, wherein:
the gas sensor element includes
a measured gas space into which the measured gas is introduced from the measured-gas intake port,
a reference-gas intake port into which the reference gas is introduced, and
a reference gas space into which the reference gas is introduced from the reference gas intake port;
the solid electrolyte body is arranged between the measured gas space and the reference gas space, the first main surface of the solid electrolyte body faces the measured gas space, and the second main surface faces the reference gas space; and
the gas sensor element has a shape that is elongated in a longitudinal direction, the measured-gas intake port is formed in a tip end in the longitudinal direction of the gas sensor element, and the reference-gas intake port is formed on a side opposite to the tip end in the longitudinal direction.

12. The gas sensor element according to claim 1, wherein:
the gas sensor element further includes a heater that heats the gas sensor element; and
the heater is configured such that a highest temperature position in a heat generation distribution in the measurement electrode film is closer to the measured-gas intake port than the center of the measurement electrode film is in the direction along the intake direction.

13. The gas sensor element according to claim 12, wherein:
  the gas sensor element includes
    a measured gas space into which the measured gas is introduced from the measured-gas intake port,
    a reference-gas intake port into which the reference gas is introduced, and
    a reference gas space into which the reference gas is introduced from the reference gas intake port;
  the solid electrolyte body is arranged between the measured gas space and the reference gas space, the first main surface of the solid electrolyte body faces the measured gas space, and the second main surface faces the reference gas space; and
  the gas sensor element has a shape that is elongated in a longitudinal direction, the measured-gas intake port is formed in a tip end in the longitudinal direction of the gas sensor element, and the reference-gas intake port is formed on a side opposite to the tip end in the longitudinal direction.

14. A gas sensor comprising:
a gas sensor element comprising:
  a solid electrolyte body;
  a measurement electrode film that is formed on a main surface of the solid electrolyte body and exposed to a measured gas; and
  a measured-gas intake port into which the measured gas is introduced, wherein
the measurement electrode film has a noble metal region that includes a noble metal, a solid electrolyte region that includes a solid electrolyte, and a mixed region in which the noble metal and the solid electrolyte are mixed together, and
the measurement electrode film has a structure in which a first average thickness of the mixed region that is present within a first region from an electrode end on a measured-gas intake port side to $\frac{1}{4}$ of an overall length of the measurement electrode film in a direction along an intake direction of the measured gas is greater than a second average thickness of the mixed region that is present within a second region that is closer to a center of the measurement electrode film than the first region in the direction along the intake direction is.

* * * * *